(12) United States Patent
Parker et al.

(10) Patent No.: US 6,281,930 B1
(45) Date of Patent: *Aug. 28, 2001

(54) SYSTEM AND METHOD FOR CONTROLLING THE FIELD OF VIEW OF A CAMERA

(75) Inventors: Jeffrey L. Parker, Jacksonville; Philip A. Marvin, Orange Park, both of FL (US)

(73) Assignee: ParkerVision, Inc., Jacksonville, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 09/244,843

(22) Filed: Feb. 4, 1999

Related U.S. Application Data

(62) Division of application No. 08/546,372, filed on Oct. 20, 1995, now Pat. No. 5,963,250.

(51) Int. Cl.[7] .......................... H04N 5/225; H04N 5/232; H04N 7/14
(52) U.S. Cl. .......................... 348/213; 348/142; 348/169; 250/206.2; 352/179
(58) Field of Search .................... 348/13, 15, 135, 348/142, 169, 170, 207, 211, 212, 213; 250/200, 203.1, 203.2, 206, 206.1, 206.2, 206.3; 352/166, 178, 179; H04N 7/14, 5/225, 5/232

(56) References Cited

U.S. PATENT DOCUMENTS

| 5,504,477 | * | 4/1996 | Whitright | 340/825.5 |
| 5,675,404 | * | 10/1997 | Nakazawa | 250/206.2 |
| 5,845,009 | * | 12/1998 | Marks | 348/169 |
| 5,917,553 | * | 6/1999 | Honey | 348/164 |
| 5,963,250 | * | 10/1999 | Parker et al. | 348/211 |
| 5,995,763 | * | 11/1999 | Posa | 396/57 |

* cited by examiner

*Primary Examiner*—Wendy R. Garber
*Assistant Examiner*—Ngoc-Yen Vu
(74) *Attorney, Agent, or Firm*—Arthur G. Yeager

(57) ABSTRACT

A system and method for control of the field of view of one or more cameras for providing that one or more subjects are to be in a single field of view ("share view") wherein the system will automatically calculate the values for the various field of view variables to provide the appropriate camera operation. Various computer-controlled programs are included to operate the system including programs for the integration of camera operation and automatic tracking of the subjects present. The system is designed for video and it can automatically add and remove subjects from a share view.

26 Claims, 20 Drawing Sheets

SHARE VIEW:

SHARE VIEW: More than 2 in the view.

SYSTEM AND METHOD FOR CONTROLLING THE FIELD OF VIEW OF A CAMERA

CROSS REFERENCE TO RELATED APPLICATIONS

This application is a division of application entitled "SYSTEM AND METHOD FOR CONTROLLING THE FIELD OF VIEW OF A CAMERA", U.S. Ser. No. 08/546,372 which was filed on Oct. 20, 1995, now U.S. Pat. No. 5,936,250.

This application is related to U.S. Pat. No. 5,179,421 dated Jan. 12, 1993, entitled "TRACKING SYSTEM FOR MOVING PICTURE CAMERAS AND METHOD"; U.S. Pat. No. 5,268,734, dated Dec. 7, 1993, entitled "TRACKING SYSTEM FOR MOVING PICTURE CAMERAS AND METHOD"; U.S. Pat. No. 5,432,597, dated Jul. 11, 1995, entitled "A REMOTE-CONTROLLED TRACKING SYSTEM FOR TRACKING A REMOTE CONTROL UNIT AND POSITIONING AND OPERATING A CAMERA AND METHOD"; U.S. Pat. No. 5,471,296, dated Nov. 28, 1995, entitled "CAMERA LENS CONTROL SYSTEM AND METHOD"; and the following applications, Ser. No. 08/586,426, filed Jan. 16, 1996, a Continuation-in-part of Ser. No. 08/255,257, filed Jun. 7, 1994, entitled "MULTI-USER CAMERA CONTROL SYSTEM AND METHOD", and Ser. No. 08/473,731, filed Jun. 7, 1995, entitled "A TRACKING SYSTEM AND METHOD FOR CONTROLLING THE FIELD OF VIEW OF A CAMERA".

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention relates to remote control of a camera and particularly to the generation of commands to controllers to provide for one or more subjects to be within the camera field of view especially in video systems.

2. Prior Art

Video teleconferencing systems are well known to the prior art. However, the ability for one or more subjects to be within the associated camera field of view and to change which subjects are within the field of view in real time generally requires manual control of the camera. Moreover, focus, zoom and other field of view variables must also be controlled simultaneously. None of the existing systems has the capability and flexibility to provide the optimum level of performance desired of modern systems.

SUMMARY OF THE INVENTION

In one aspect of the present invention there is provided a method of controlling the field of view of at least one camera included in an automatic control system comprising the steps of: selecting values for one or more field of view variables from the following list of variables that define the field of view of a camera to create a field of view unique to each subject;
1. field of view position variables,
2. field of view perspective variables,
3. camera imaging variables, and
4. automatic control system variables; defining share view as the field of view of a camera created by combining the respective coordinates and field of view variables associated with each of at least two subjects; requesting a share view for the respective subject that is identifiable as such by the automatic control system; and controlling the camera by the automatic control system to provide for the field of view requested in accordance with the values selected.

Other aspects of the invention include the steps of: establishing a location preset for each subject in terms of the coordinates for the position of each subject; issuing a command by one subject for controlling the camera by the automatic control system to provide the field of view of the camera to be the location preset of one subject; issuing a command from a second subject requesting share view for the first and second subjects;recalling the location preset for the second subject; determining the relative positions of the location presets for the first and second subject; calculating the values of the field of view variables of the camera necessary to create a share view for the first and second subjects; and controlling the field of view of the camera to provide for a share view for the first and second subjects. Further aspects include calculating the respective angle of view of the camera for each location preset; and issuing a command from a third subject requesting share view for the first, second and third subjects; recalling the location presets for each of each subject to be in share view; determining the relative positions of the location presets for each subject; calculating the values of the field of view variables of the camera necessary to create the requested share view; and controlling the field of view of the camera to provide the requested share view. Each one of the three subjects request to be removed from the share view and a share view for the other two subjects will be created.

Other steps include defining the group angle the angle of view of the camera required to include all subjects and creating group view. The system can alternate between share view and group view as required.

BRIEF DESCRIPTION OF THE DRAWINGS

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings, in which:

DETAILED DESCRIPTION OF THE PREFERRED EMBODIMENT

Background

Figure 1:
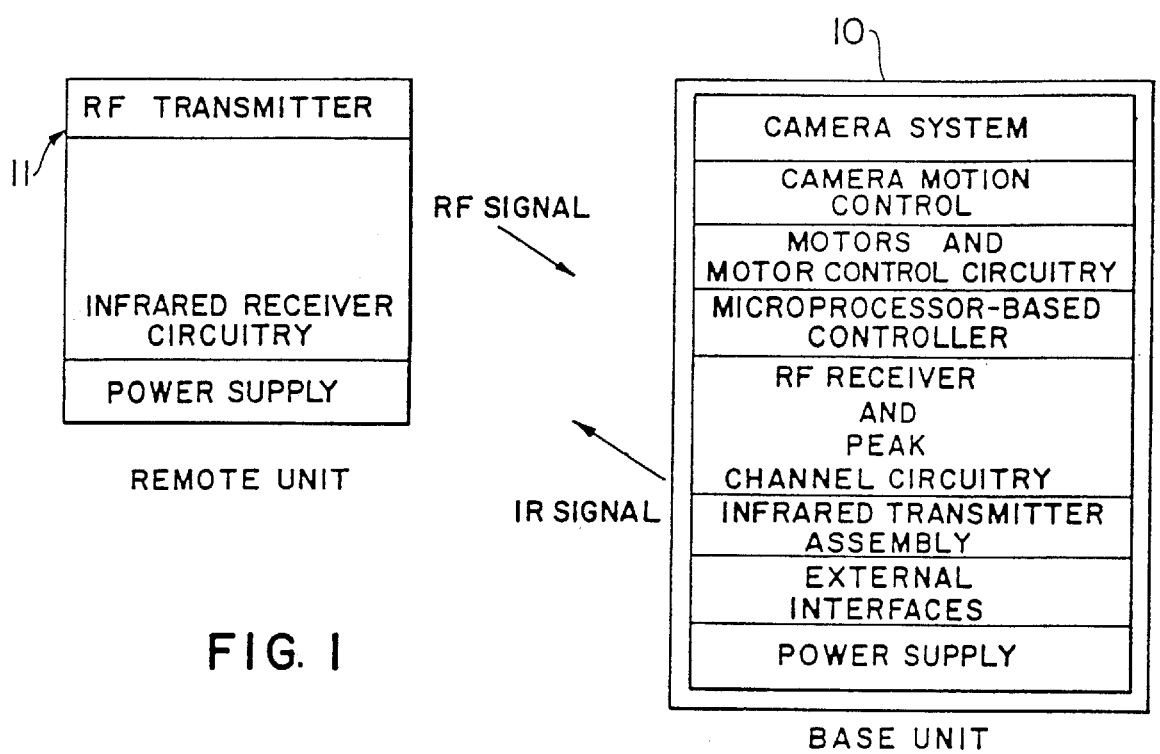
FIG. 1 is a simplified block diagram of the base unit and a remote control unit of the prior art used in the present invention.

A brief review of the design and operation of U.S. Pat. Nos. 5,268,734; 5,517,300; 5,432,597; and 5,471,296; and the prior application Ser. No. 08/586,426 will be helpful in explaining the technology employed herein (FIG. 1).

The base unit of the tracking system transmits an infrared signal through rotating set of lenses or signal shapers designed to structure the IR beam in a predetermined process. The base unit includes a microprocessor which monitors indicating circuitry to calculate the error from exact alignment between the base unit and the remote unit. The remote unit transmits an RF signal to the base unit containing the information regarding the received IR signal, particularly the instantaneous strength of the signal. The base unit contains computational circuitry to calculate the distance and the angle of the structured IR beam relative to the reference angle created by the system, usually 0 degrees or exact alignment. When the received IR signal strength reaches a maximum or "peak" value, the angle of the IR beam relative to the reference angle will be determined by the base unit circuitry.

The remote unit in the basic system may be a wand, personal locator, or brooch and includes audio circuitry and the capability of utilizing either internally or externally mounted IR sensors. The remote unit can transmit infrared tracking information or other IR signal data to the base unit as well as "Commands". The system also employs electronic means to operate the camera controls.

Other features include a PAN and TILT position indicator employing an optical disk that rotates through an optical detection system to monitor actual position. The system employs an optical disk position indicator that provides an absolute position output signal rather than relative movement. The electronics of the base unit is substantially similar to that illustrated in the cited applications.

Software for the operation of the system is placed in ROM and includes programs for response of the base unit to commands from the remote unit or wand and the complete operating functions of the system including location presets and the operation of all controls associated with the camera.

The system determines the error that exists between the actual position of the PAN and TILT reference planes of the base unit from PAN and TILT position circuitry and the relative position of the remote unit with respect to the same reference planes. This error can be calculated in terms of degrees of angular deviation between the two positions or it can be expressed in more abstract terms, such as clock counts, if desired.

The present invention is directed towards the complete control of the lens of the camera and the coordination of lens control with the tracking functions of the base unit and the command functions of the remote unit. In this regard it is important to note that optical functions can be dealt with electronically in some CCD cameras. One of the principal objectives of the present invention is the control of the field of view of the camera which represents the selectable portion of the total image physically available to the camera that is supplied by the camera. That is, not everything within the physical range of the camera lens is necessarily "seen" by the camera at a particular time and camera then supplied as an output. The use of "zoom functions" that may require changes in the optical or electronic magnification of the camera lens is a case in point. The movement of a ZOOM lens into a "tighter" shot results in significantly less image "seen" by the camera with respect to the total image physically available at other lens positions. The present invention is directed to the control of the field of view of any type of image-receiving device and is adaptable to interface with the specific technology involved.

From the foregoing it can be seen that the camera lens control apparatus is completely under the control of the microprocessor-driven base unit. Algorithms are provided for the complete control of ZOOM, FOCUS and IRIS and other camera image variables to provide for the desired position change and the rate of position change of the lens system. For example, the speed of convergence of the ZOOM, FOCUS and IRIS functions from one position to another can be controlled to work together for the smoothest performance needed in a particular application.

The present system is designed with the capability to track a subject (such as remote unit) and to automatically control all variables in the system such as ZOOM, FOCUS, IRIS, subject position within the field of view, shutter speed, white balance, etc.; tracking sensitivity (rate of error elimination); and the size and shape of windows or zones all with regard to selectable predetermined criteria such as the distance between the remote unit and base station and the location of a remote unit within an area or room.

Tracking window is defined as the number of degrees from a reference of 0 degrees that the subject may move before the base unit moves. The size of a window may be programmed by the user or automatically controlled by the system. Window size is one of several variables in the system that can be programmed.

For ease of discussion, the system variables may be classified in the following groups:
A. field of view position variables;
B. field of view perspective variables;
C. camera imaging variables;
D. automatic control system variables; and
E. automatic tracking system variables.

Independent and dependent variables can be created and linked together by mathematical relationship or a look-up table. When an independent function is changed, the system may adjust any dependent function of the "link list" of the independent function.

Link lists in their simplest form declare which dependent variables will be automatically controlled by an independent variable. The hierarchal structure of the link list allows the system to be controlled with more than one independent variable by having more than one link list. A particular link list, for example, may have ZOOM as an independent variable and framing ("offset"), tracking windows, and tracking sensitivity as dependent variables. The system will support as many lists as required.

Location presets are included to provide the capability to move the base unit to a pre-programmed (remembered) PAN and TILT position data. A location preset will also move FOCUS and ZOOM to the position they were set to at the respective preset position. IRIS and other image variables (GAIN, SHUTTER SPEED, WHITE BALANCE, etc.) can also be programmed to be changed in the same manner as FOCUS and ZOOM or it can continue operation in response to light level.

The base unit can also be programmed to automatically change linked variables such as ZOOM, FOCUS, IRIS, framing, window and tracking sensitivity when the base unit is at a particular PAN and TILT position or range of position. For example, the base unit may use one setup over a first given range (in degrees) and use some other configuration at a given second range outside of the first range.

The methodology employed in the use of link lists in the system includes the following steps. First, independent and dependent variables are established. Second, the dependent variables that are to be automatically controlled by specific independent variables are selected (by way of the creation of a link list). Third, the relationship between an independent variable and a dependent variable is established by way of a look-up table or mathematical relationship or whatever other means may be chosen. The system will then automatically change the value of the dependent variable(s) whenever the value of the independent variable is changed in accord with the established relationship between them.

INTRODUCTION

Systems for controlling the field of view of one or more cameras have been disclosed in prior filings as well as other cited prior art.

Field of view control may be accomplished by manual means such as the issuance of commands to a control device which may pan, tilt, and control field of view perspective (zoom control). Field of view control may also be accomplished by semi-automatic means whereby field of view positions (commonly referred to as location presets) can be remembered and recalled at a later time. Also, location preset systems can be somewhat automated such as cited in U.S. Pat. No. 5,206,721, Ashida et al whereby the activity from individual microphones represent individuals that can be monitored with an individual speaker selected to be included in the field of view of a camera. Field of view control may also be accomplished by automated means whereby means to automatically track a reference or subject with the field of view of a camera can be accomplished. U.S. Pat. Nos. 5,268,734, 5,179,421, 5,432,597, 5,471,296 and patent applications Ser. Nos. 08/473,731 and 08/586,426 disclose and teach manual, semi-automatic, and automated field of view control of cameras.

In U.S. patent application Ser. No. 08/586,426 multi-user field of view control of one or more cameras is taught. One configuration taught is that of a multi-user field of view control where an automatic control system consisting of one or more remote control units (also referred to as personal locators) is created with each remote control unit being associated with unique field of view variables that represent a specific individual or subject. Coordination by the automatic control system controls the field of view to recall the unique field of view variables for that subject.

An example of the practical application of this type of field of view control is for group use where any member of a group can send a command to the automatic control system thereby commanding the system to control the field of view for the benefit of that particular individual. By associating the proper field of view variables for the remote used by that individual, and associating those variables with the remote control device, the issuance of a command to the automatic control system can change the field of view from that of a general group view (group view being defined as a view where the field of view pan and tilt positions, zoom perspective, and camera imaging variables would be used by and represent an entire group), to the appropriate view of the individual subject (being defined as the proper pan, tilt, zoom and camera imaging variables for that of the specific individual issuing the command). This type of field of view control methodology greatly enhances the effectiveness of video communication by focusing the field of view on the specific individual speaking and provides the facial details and eye contact required for effective person to person video communication.

An example of the application of such a multi-user system would be to control the field of view of one or more cameras in group video teleconferencing or video recording applications where multiple individuals desire to self administer camera field of view control.

Field of view variables that can be included in such an automatic control system are to control the field of view to automatically find and track a subject—via an autotracking personal locator (also called an autotracking remote control unit), rather than utilize fixed pan/tilt/zoom location preset positions to represent the desired field of view of the individual subject. By providing means to automatically control the position of the field of view and field of view perspective an additional level of field of view automation is accomplished. This also provides for more flexibility as the subject does not have to stay in one location to be properly represented in the field of view.

Although individualized field of view control is provided, the aforementioned system is limited in flexibility for what may be required for more spontaneous group discussions. One limitation is where such a system is employed in group video teleconferencing. In these applications multiple individuals are communicating with multiple individuals at other sites. When employing the previously described Personal Locator type system, as each individual wants to visually communicate a command is issued from their respective personal locator. The automatic control system responds by controlling the field of view to recall those variables that have been associated with that individual subject; and generally speaking, will focus the field of view on that individual as they speak. As dialog progresses from individual to individual the field of view is controlled accordingly as each individual commands the system via their remote control device.

A limitation to this approach, however, is that if one individual has control of the camera field of view other individuals that may want to participate in the dialog at that same site may likely be excluded from the video image that is being sent to the other sites. As previously described, one alternative to this situation is to employ a common set of field of view variables that any of the individuals can command from the automatic control system—i.e., a complete group view. This common set of field of view variables may likely be set to recall a field of view of the entire room or space, thereby including everyone that could be in the field of view.

The limitation in this approach, however, is the fact that the view of the entire room may not provide an image with enough facial detail or eye contact of any one of the participants to provide the true benefit of visual communications which greatly diminishes the overall impact of the communication.

A shared field of view in accord with the present invention is defined as a field of view of a camera whereby each subject's position coordinates in relationship to the field of view (and optionally each subject's related camera imaging variables) are taken into account so that the best manner of displaying two or more subjects in a single field of view can be automatically created by a field of view control system. This will alternately be referred to as "Share View". It should also be noted that while a single field of view may be created with a single camera, shared field of view control techniques could be accomplished via the coordination of two or more cameras combined into a single video image thereby effectively creating a single field of view from multiple cameras; this could be accomplished via video screen splitters/combiners and/or video processing equipment whereby multiple cameras create a single video output that can ultimately be transmitted, and/or viewed, and/or recorded.

Shared field of view control is initialized by the automatic control system upon the determination that more than one subject desires and/or needs to share the field of view with one or more other subjects.

As previously disclosed, field of view control and associated commands may be accomplished via an automatic control system which can receive commands from several different means. It can receive commands from a serial communications means that may be hardwired via an RS-232 port, and/or an RS-485 multi device serial communications port, and/or other communications means such as wireless communications means like those from RF (radio frequency) commands sent to an RF receiver that is an integrated part of the communications capability of an automatic control system.

In one embodiment a shared field of view system is created when each subject is represented by a personal locator that can issue a command which indicates a request to share the field of view. Additionally, a personal locator can be selectively set to act as a master controller so that the subject is recognized as a priority subject which ensures that this subject has priority in share view and group view situations. Examples of system operation include the following:

1. If the camera field of view is currently at group view, which is a view that includes all of the possible participants in the video then when a share view command is issued, the camera field of view will be controlled to go to the field of view variables for that specific subject—the equivalent of a "my turn" command as described in the previously filed multi-user application and which creates a single user field of view.

2. If the camera field of view is currently controlled for the field of view variables of a specific individual—i.e., the field of view is already controlling for a "my turn" field of view then the field of view variables for the specific individual that issued the share view command will be taken into account along with the current field of view variables and following the necessary share view calculations a shared field of view for both of the subjects will be created. By following these calculations the pan/tilt/zoom and camera imaging variables will be automatically modified to include both of the subjects in the camera field of view.

3. As additional subjects issue a share view command the system will continue to perform share view calculations and by taking into account the subject coordinates and related information will continue to add additional subjects to the camera field of view to those subjects that are already in the field of view.

4. As subjects that are included in a share view desire to be removed from the share view they can issue a remove share view command. The system will perform the necessary share view calculations to remove individual subjects issuing remove share view commands. The field of view will be controlled to effectively include only those subjects that have previously requested share view. If a remove share view command is issued and there are no other subjects requesting the field of view the system will go to the group view.

5. If the group view, which includes subject coordinates representing all of the subjects that have been recognized by the system, is determined to be beyond the physical capabilities of the field of view of the camera(s) then the control system can issue a warning to the user that a group view of all subjects is not possible. From this situation the user can select one of several options that will determine how the system will respond to such a situation:
   a) create a group view that includes as many subjects as possible (majority wins); or
   b) create a group view that must includes a priority subject (so designated by using a master personal locator) and then add to that view as many subjects as the field of view is capable of handling.

6. If when a share view is being created via a share view command the automatic control system determines that all of the subjects requesting (by issuing a command or automatically) to share the field of view cannot be accommodated due to the physical limitations of the field of view then the user can select one of several options that will determine how the system will respond to such a situation:
   a) create a share view that includes as many subjects as possible (majority wins); and
   b) create a share view that must include a priority subject (so designated by using a master personal locator) and then add to that view as many subjects as the field of view is capable of creating in addition to the position of the master.

In this embodiment if the subject is represented by personal locators that use location presets for the subject coordinates and the associated unique field of view that is created for each subject it will be this information that is fed into the appropriate share view calculations to create the various individual, group and shared field of views. If the personal locators are equipped with autotracking capability, then the subject coordinates and related information are a result of the automatic tracking system finding the position of the subject and reporting the subject's pan, tilt, distance (x, y, z planes) coordinates in relationship to the camera field of view which are then fed into the share view calculations to create the various field of views. A system which could be comprised of both location preset personal locators and autotracking personal locators could also be created.

In addition, in a situation where autotracking personal locators are employed, the system can employ options as to how to respond to the subject's coordinates that are sent from the autotracking locators. The system can be setup to:
   1. continuously track the subject upon the issuance of a share view command; therefore share view will be continuously readjusting as the position of the subjects move in relationship to the camera field of view; or
   2. track the subject upon issuing a share view command only until the field of view has been altered to satisfy the field of view positioning; therefore share view will be adjusted to take into account the command issued by the subject but will then stop adjusting the field of view once the field of view has achieved a share view that satisfies the error(s) between the subject's actual position and the desired field of view position in relationship to the field of view.

All the previously disclosed autotracking methods and capability can be employed when autotracking personal locators (tracking response, framing, windows, etc. and appropriate link lists thereof).

Another embodiment of a share view system can be achieved by using the present applicant's microprocessor-controlled Programmable Response Module (PRM). This is an interface to the previously disclosed camera system whereby hardwired contact closures can be interfaced to the PRM for the purpose of assigning a unique address to each contact closure which can then be associated with a unique location preset and field of view variables. The contact closures can be in association with a microphone which provides a contact closure that triggers its specific PRM input as well as activates a microphone which can be interfaced to an audio mixer for multiple microphone audio mixing. Microphone Switch inputs are wired directly to the Programmable Response Module. When a user presses the button located on the microphone, the PRM detects a "button press" and issues the command to send the camera to the address (location preset) associated with that particular button. The camera will remain at that location preset until the button is released or an additional microphone button is pressed from another microphone which will activate Share View. Each microphone is associated with a specific address. At the specific address, the location preset information such as the pan, tilt, zoom perspective, focus and image variables are available. All of the Group View Calculations are automatically done when each individual location preset is setup.

An Automatic Share View System is created by the addition of a device that can represent that an individual should be included in the camera field of view without the individual having to issue such a request (command) manually. One example of an automatic share view system is from the combination of a microphone activity device, such as the AudioLink Plus (™) device by Sound Control Technologies in combination with the Programmable Response Module. The present control and tracking system and appropriate share view software logic are implemented in the Programmable Response Module.

The AudioLink Plus is a device that allows individual micro-phones to be identified via microphone activity outputs whenever the AudioLink Plus detects audio activity at the individual microphone; therefore providing an automatic representation of individuals speaking. The AudioLink Plus has selectable logic including 1) whenever audio is detected at a specific microphone then that microphone activity output is activated—in this mode one or more microphone activity output can be activated simultaneously; 2) activate the microphone activity output for the loudest microphone audio only, or 3) activate the loudest microphone activity output for the loudest microphone audio that is above the average of all microphones.

By using AudioLink option number 1 combined with the Programmable Response Module and the programmed logic therein an automatic share view system is created. The practical result is as follows:

1. If no individuals have been speaking (no microphone activity outputs are true) for a time period that is longer than a predetermined (FIG. 17, timer 3) time the field of view is controlled to be that of the Group View.

2. If the field of view is in the Group View and one individual begins speaking (one microphone activity output is true), then once the system confirms that this individual has been speaking long enough (a predetermined time period FIG. 17, timer 1) the field of view is controlled to go to the location preset for that specific individual (the equivalent of "my turn").

3. If the system currently is at a location preset for one individual (either one microphone activity output is true or the microphone activity output is not true but a timer (FIG. 17, timer 2) since this occurred has not timed out) and a second or additional individuals begin speaking (one or more microphone activity output(s) are true), a share view is created to include the second and additional individuals.

Figure 17:
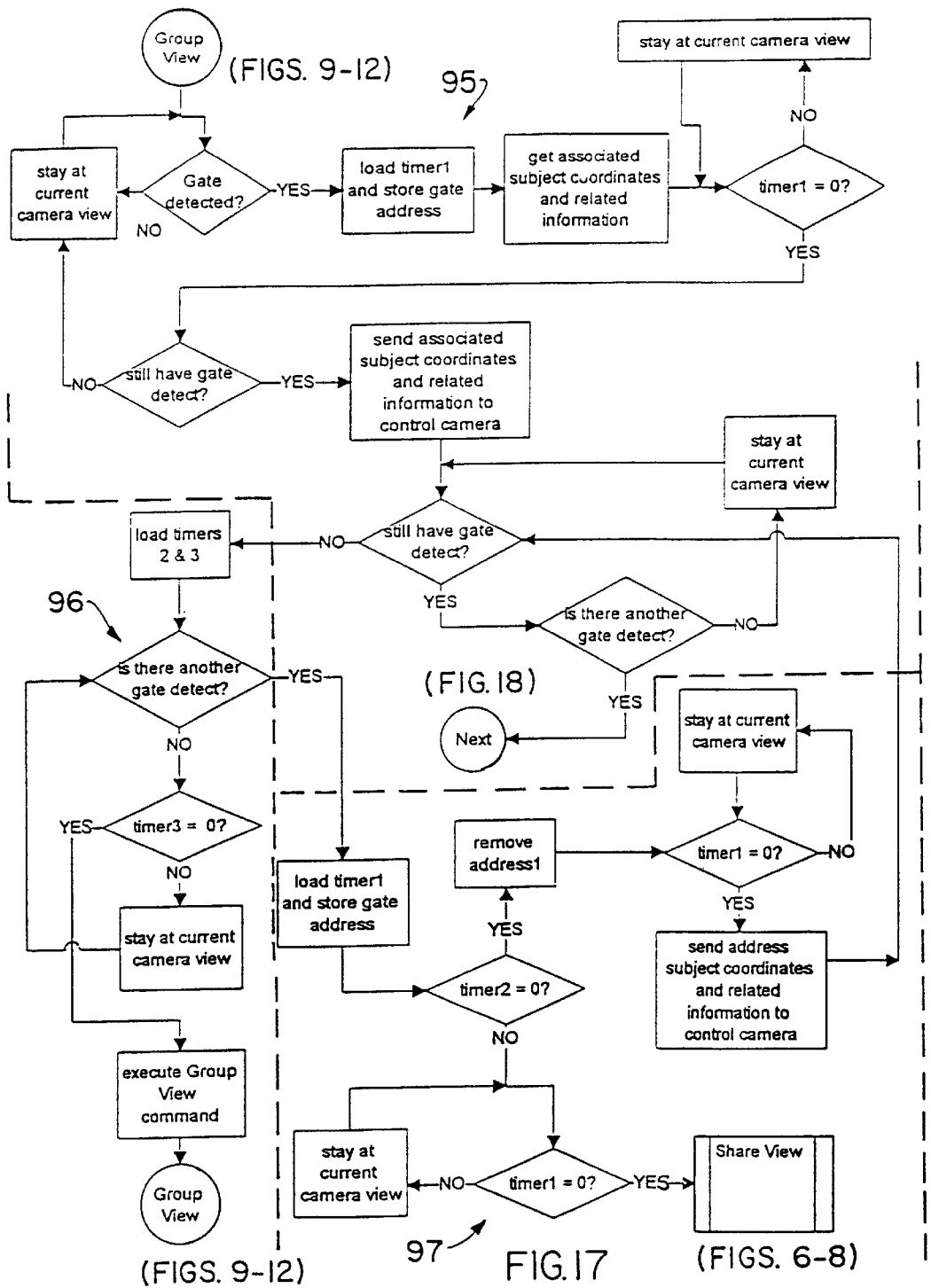
FIGS. 17–20 are flow charts that illustrate the programs used with the apparatus of FIG. 16.

4. Individuals are removed from the share view when they stop speaking (their microphone activity output is not true) for a specific time period (FIG. 17, timer 3).

The automatic share view system can also use an optional additional timer whereby the individual is removed from the share view when they stop speaking but in a different time frame than that used when the system goes from the view of an individual location preset to that of a Group View.

Another level of automation in an automatic share view system can be accomplished from a system that combines the use of a microphone activity device with the use of automatic tracking personal locators. In the previously disclosed multi-user application it was disclosed that personal locators can be equipped with audio microphones. In that disclosure the audio microphones were active only during certain conditions being true. In this embodiment the audio microphones are interfaced to the microphone activity device and the personal locators would be continuously sending audio output information to the microphone activity device. This provides for a system for automatically determining which subjects should be included in a share view; however, an additional level of automation is achieved as the share view calculations are created from the pan, tilt, zoom, imaging coordinates of an automatic tracking system, therefore providing a more dynamic and flexible system that can follow the position of the subjects automatically creating an automatic-triggered (via audio) autotracking share view system. In this situation when the audio activity of a locator triggers the system to include that specific locator the system enables autotrack for that locator and receives the appropriate positioning and imaging variables and acts upon this information in an automatic share view manner. This would use the automatic tracking logic previously disclosed in combination with the microphone activity systems logic disclosed.

It is also possible to create variations of the previously described embodiments by the combination of systems. Combinations of autotracking personal locators, location preset personal locators, automatic share view, and subject issued share view command systems can be created with these combinations executing the group view, individual view ("my turn"), and share view concepts in a combined system.

The share view concepts can also be used with other interface means such as a computer monitor or touchscreen whereby an operator could create share views by following the methods disclosed that create share view when the operator determines that more than one subject should be in the camera field of view. This could be accomplished via the operator selecting the location preset numbers for those participants and then the system would automatically respond by calculating and achieving a share view for the selected locations. Participants could also be graphically represented on a touchscreen or monitor screen and the facilitator could simply touch those participants that are desired to be in or out of the field of view and a share view would automatically be calculated and acted upon as discussed herein.

The share view methods can also be used with other techniques for determining subject coordinates gathered from other tracking system technology.

Regardless of where the information originates to the automatic control system, a shared field of view control system in accord with the present invention uses information which represents where in relationship to the field of view individuals are located and then takes into account which of the more than one individuals should be represented in the field of view of the camera to create a shared field of view.

SYSTEM DESCRIPTION AND OPERATION

With reference now to FIGS. 2–19 and Tables 1 and 2, the following equations and definitions are used throughout the system.

DEFINITIONS

1. Camera Max View: This is the Maximum field of view of the camera that obtains when the camera has a zoom position of Full Wide (0).

2. Pan Group Angle: This is the view that includes all previously identified users of the Personal Locator in the Pan angle of view. See equation 1.

3. Tilt Group Angle: This is the view that includes all previously identified users of the Personal Locator in the Tilt angle of view. See equation 1.

4. Pan Group Zoom: The zoom position for the camera that achieves the Pan Group Angle (Pan angle of view). See equation 5.

5. Tilt Group Zoom: The zoom position for the camera that achieves the Tilt Group Angle (Tilt angle of view). See equation 7.

6. Pan Group Position: The absolute pan position of the camera to achieve the Pan Group View. See equation 2.

7. Tilt Group Position: The absolute tilt position of the camera to achieve the Tilt Group View. See equation 2.

8. Group Position: The absolute position of the camera that combines the Pan Group Position and Tilt Group Position to achieve the Group View. See equation 2.

9. Group Zoom: The zoom position for the camera that achieves the Group View. See equation 7.

10. Group View: The result of equations 1–7 which represent the combination of the Pan Group Angle, Tilt Group Angle, Pan Group Zoom, Tilt Group Zoom, Pan Group Position, and Tilt Group Position to provide a field of view that is representative of all of the subject coordinates and related information in order to get all of the users in the field of view.

11. Pan Share Angle: The desired pan angle between the subject coordinates and related information in the pan plane that desire to be in the field of view for the camera. See equation 1.

12. Tilt Share Angle: The desired tilt angle between the subject coordinates and related information in the tilt plane that desire to be in the field of view for the camera. See equation 1.

13. Pan Share Zoom: The zoom position for the camera that achieves the Pan Share View (pan angle of view). See equation 5.

14. Tilt Share Zoom: The zoom position for the camera that achieves the Tilt Share View (tilt angle of view). See equation 7.

15. Pan Share Position: The absolute pan position of the camera to achieve the Share View. See equation 2.

16. Tilt Share Position: The absolute tilt position of the camera to achieve the Share View. See equation 2.

17. Share Angle: The result of the combination of Pan Share Angle and/or Tilt Share Angle in order to achieve the desired field of view between subject coordinates and related information that desire to be in the field of view. See equation 1.

18. Share Zoom: The zoom position for the camera that achieves the Share View. See equation 7.

19. Share Position: The absolute position of the camera that combines the Pan Share Position and Tilt Share Position to achieve the Share View. See equation 2.

20. Share View: The result of the equation 1–7 which represents combination of the Pan Share Angle, Tilt Share Angle, Pan Share Position, Tilt Share Position, Pan Share Zoom and Tilt Share Zoom that provides a field of view that achieves a combined field of view that is representative of all the subject coordinates and related information included in order to get all of the respective users in the field of view.

21. Extreme Right: The furthest location preset that is located to the right of the cameras center reference. The pan angle is referred to in the flow chart as largest pos, largest right.

22. Extreme Left: The furthest location preset that is located to the left of the cameras center reference. The pan angle is referred to in the flow chart as largest neg, largest left.

23. Extreme Top: The furthest location preset that is located at the top of the cameras center reference. The tilt angle is referred to in the flow chart as largest top.

24. Extreme Bottom: The furthest location preset that is located at the bottom of the cameras center reference. The tilt angle is referred to in the flow chart as largest bottom.

25. Location Preset: An absolute field of view position that consists of at least one of the following variables: pan, tilt, zoom perspective, imaging variables, focus variables.

26. Personal Locator Location Preset Command: A command issued to the automatic control system that causes at least one of the location preset variables to be remembered and associated with a personal locator.

27. Location Preset Command: The same information stored as defined for the Personal Locator Location Preset Command except without the location preset information being associated with a specific personal locator.

28. Personal Locator: A remote control unit that can communicate via commands to the automatic control system via wired or wireless means. Each locator can be identified by the automatic control system via a unique address established at each locator. The locator may optionally be able to receive commands from the automatic control system or other external communication devices. The personal locator can issue commands to the system for setting a personal locator location preset that is associated with that specific locator, can recall the associated personal locator preset, and issue a group view command, share view command, remove share view command and can issue commands for manual control of camera field of view functions such as pan, tilt, image, focus and zoom commands.

29. Chairperson Locator: The same as the personal locator with the additional distinction of being identifiable by the automatic control system as being a chairperson locator. This locator can also issue lock and unlock commands to the automatic control system which can disable the automatic control system from acting upon commands from personal locators when the system is in the lock mode.

30. Personal Tracking Locator: A remote control unit that the automatic control system can automatically determine its the position of the unit in relationship to the field of view in at least one of the following: pan, tilt, field of view perspective relationship. The personal tracking locator may also embody all of the automatic tracking variables as previously disclosed in applicants previously filed disclosures. As disclosed hereinabove the automatic tracking capability provides for means of determining where in relationship to the field of view the locator will be maintained during automatic tracking by the field of view. Since the locator can be either operatively connected to a subject to be tracked or kept in known relationship to the subject the personal locator can create a reference to automatically establish and maintain the relationship of a subject to the field of view. The personal locator can issue all of the commands of a personal locator or be configured as a chairperson locator.

31. Automatic Tracking: Controlling the field of view of a camera to automatically position the field of view to track a reference means.

32. Share View Command: A command issued to the automatic control system which causes the system to execute a share view.

33. Remove Share View Command: A command (in applicant's software is executed as a redundant Share View Command) issued to the automatic control system which causes the system to remove a user (a location preset) from the Share View.

34. Group View Command: A command issued to the automatic control system which causes the system to execute a group view.

35. Pan/Tilt: An absolute position in the horizontal plane (pan) or vertical plane (tilt) that the camera field of view can be adjusted. Pan and tilt can be measured in counts by the automatic control system or converted to degrees. This can be accomplished via mechanical means; by having a camera field of view in known relationship to an associated mechanical base unit; or, via electronic means, by selectively choosing that portion of the imaging device which is used for video output. It may also include the combination of a CCD imaging device which includes electronic pan/tilt control with a mechanical base unit for physically positioning the CCD imaging device as well such as the Hitachi VK-C77S(A) camera.

36. Pan/Tilt Angle: The angle that is created by determining the pan or tilt position as compared to the camera reference position.

37. Field of View: The effective viewing area of the camera's imaging pickup device. Different field of view perspectives can be achieved by physically adjusting optics to allow for magnification of the field view, generally measured by optical magnification power called "zoom", or can be electronically adjusted by selectively choosing that area of the camera's imaging device that is to be displayed and using only the selected areas of the complete video to be displayed—effectively an electronic "zoom". The Hitachi VK-C77S(A) camera for example, is equipped with both an optical and an electronic field of view zoom whereby the optical zoom provides the first 12 powers of zoom and the electronic zoom in combination with the optical zoom provides zoom powers 13 to 24.

38. Field of View Perspective: The resulting view achieved by adjusting the zoom (optical and/or electronic) of the field of view.

39. Camera Reference Position: An absolute position in the pan and/or tilt planes.

40. Imaging Variables: The camera variables which determine the resulting image intensity from the camera. Generally these relate to the adjustment of iris, gain, white balance, shutter speed and brightness. These may be adjusted by the automatic control system and/or may be an automatic function of the camera.

41. Focus: The camera variables that can be adjusted which determine which objects in the field of view are in focus. These may be adjusted by the automatic control system and/or may be an automatic function of the camera.

42. Autotracking Share View: The creation of a share view from autotracking system data.

43. Average Image: The imaging variables associated with the subjects in a group or share view that are calculated by averaging associated image variables values to create the values of the imaging variables for group or share view.

44: Subject coordinates and Related Information: Data indicative of the position of the subject in relationship to the field of view and associated system variables.

45. Angle of View: Effective field of view of the camera at any distance. See Table 2.

46. Auto Image: Variables automatically selected for the camera field of view.

Flow Charts

Figure 2:
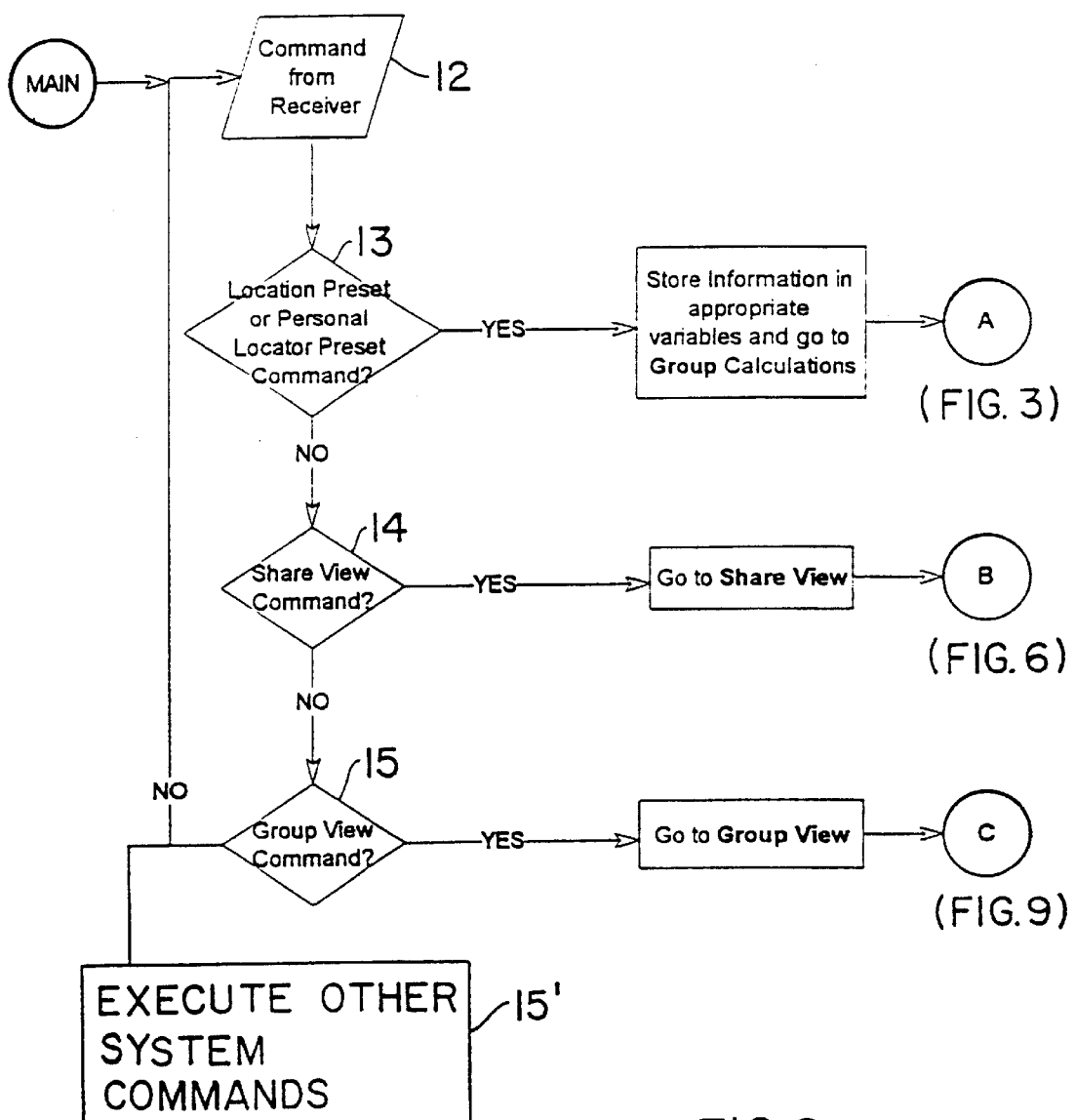
FIGS. 2–3 are flow charts of two programs of the present invention.

FIG. 2 illustrates the initial decision making of the program that operates the system. The command (Block 12) is received by the base unit 10 from a remote unit 11 which may be in the form of a personal locator (FIG. 1). The command is analyzed to determine whether it is Preset Command (Block 13); a Share View Command (Block 14); or Group View Command (Block 15) or other system commands (Block 15'). The desired program is run depending upon the type of command received.

Figure 3:
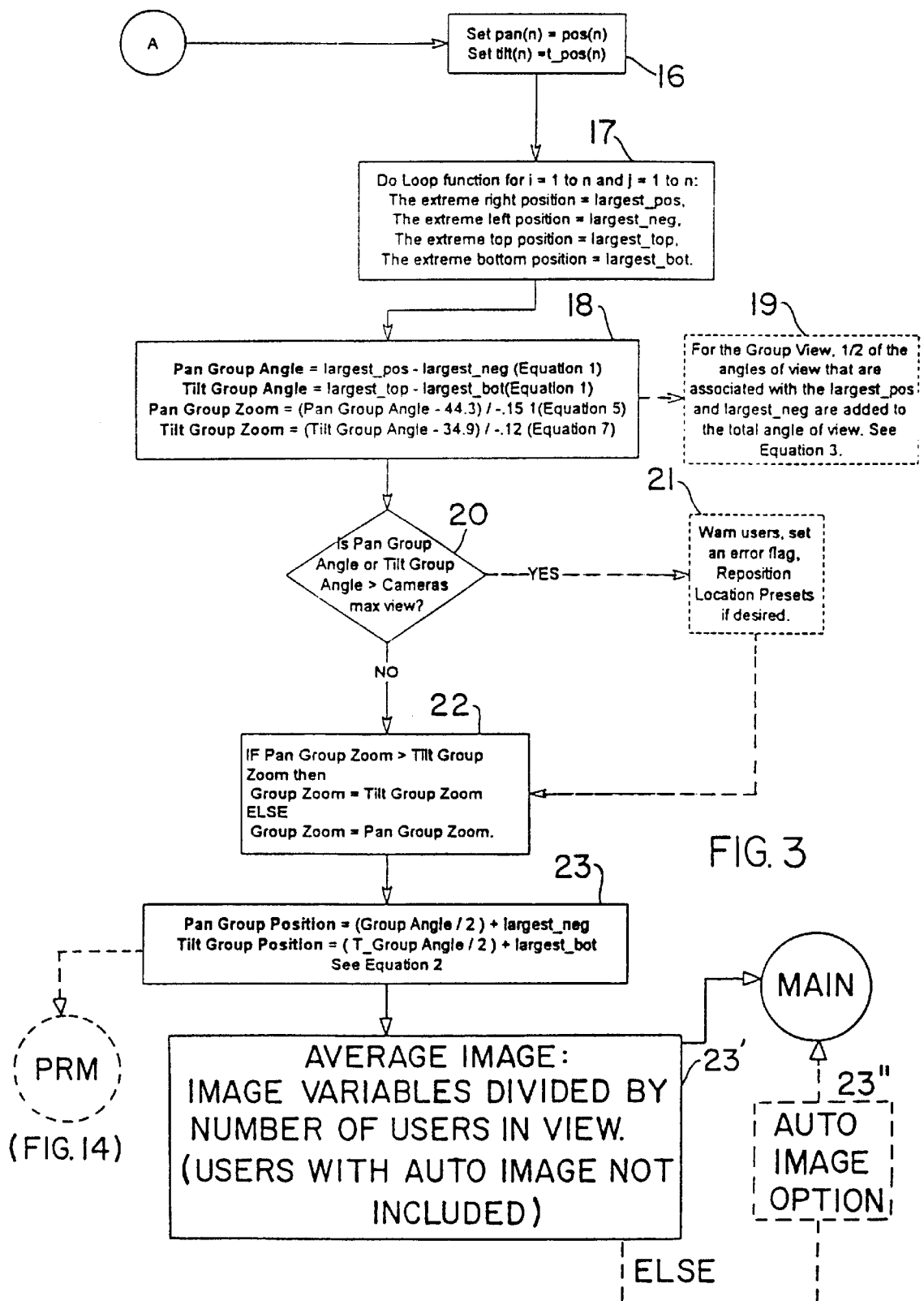
Figure 4:
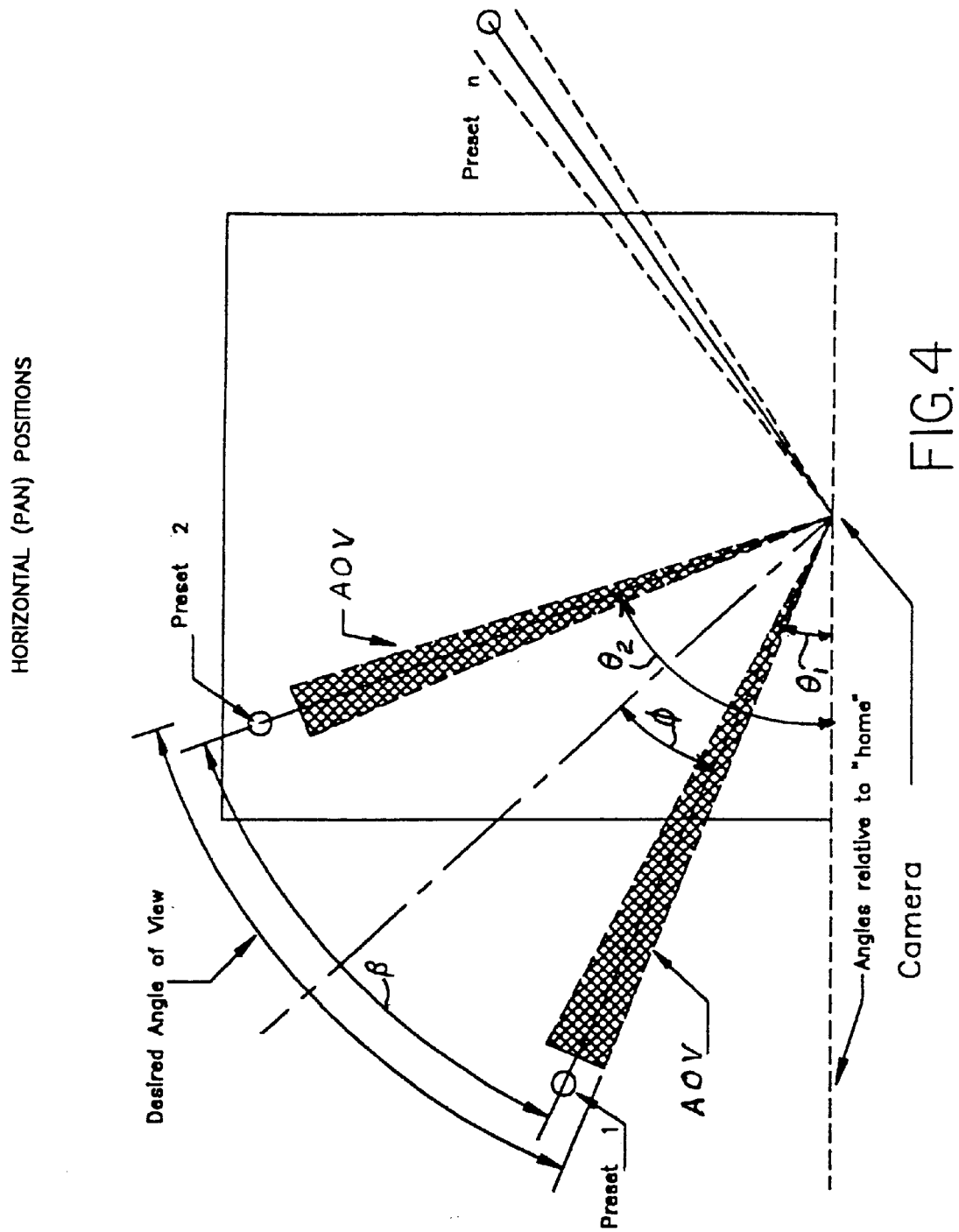
FIGS. 4–5 are pictorial diagrams that illustrate the geometry employed in computations in the present invention.

FIG. 3 illustrates the Group View calculations. The total number of location presets is established for both the Pan and Tilt Planes (Blocks 16, 17). The Group Angles and Zoom Position is calculated (Block 18) and expanded for the Total Group (Block 19) as described with reference to FIGS. 4 and 5. In FIG. 4, location preset #1 has an Angle of View (AOV) shown shaded. The location (shown as a circle) has an angular displacement from a reference and the AOV has a known field of view for a given camera.

Figure 5:
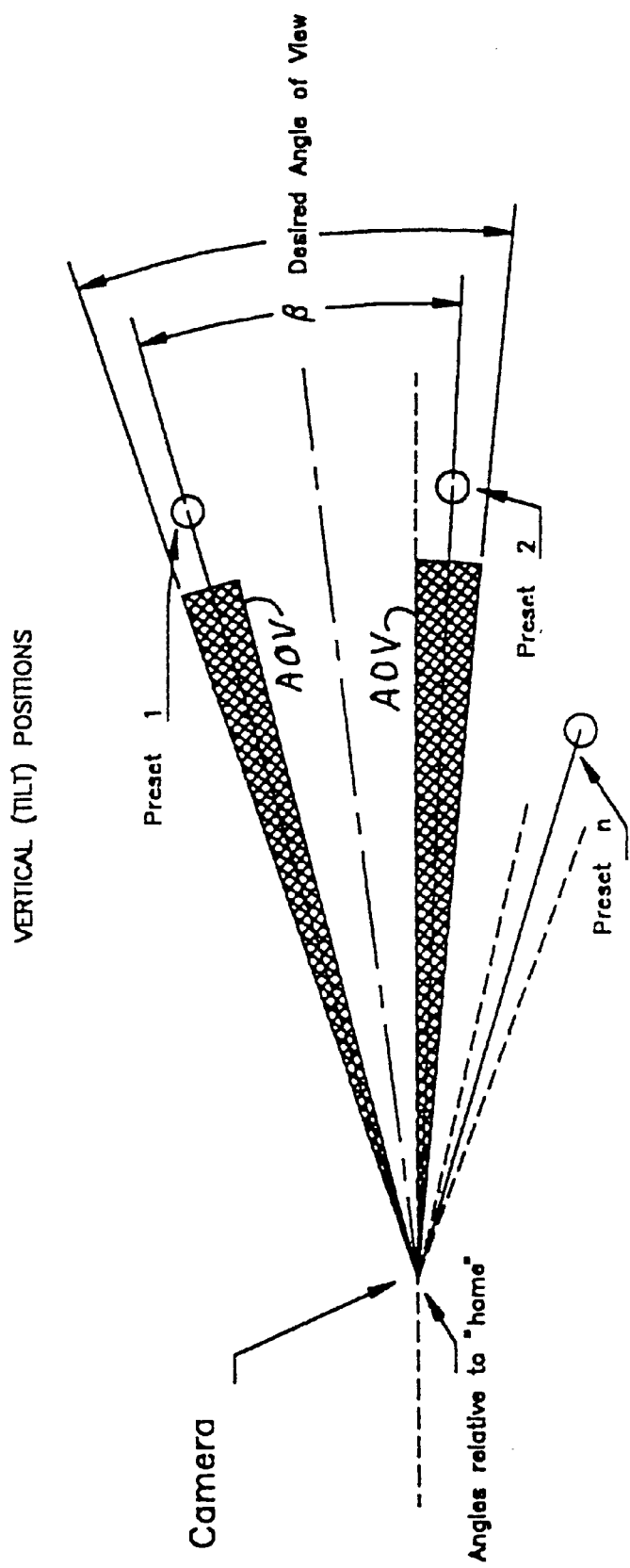

With the desired angle of view of FIGS. 4 and 5 calculated, maximum Pan and Tilt angles, which are known for a given camera, are compared with the known maximum Pan and Tilt angles for the camera (Blocks 20, 21) and the lesser zoom position chosen to achieve the desired group view (Block 22). The Group Positions of the Camera are then calculated (Block 23). The Group position and Average Image (or, optionally, Auto Image) are calculated (Blocks 23',23").

Figure 6:
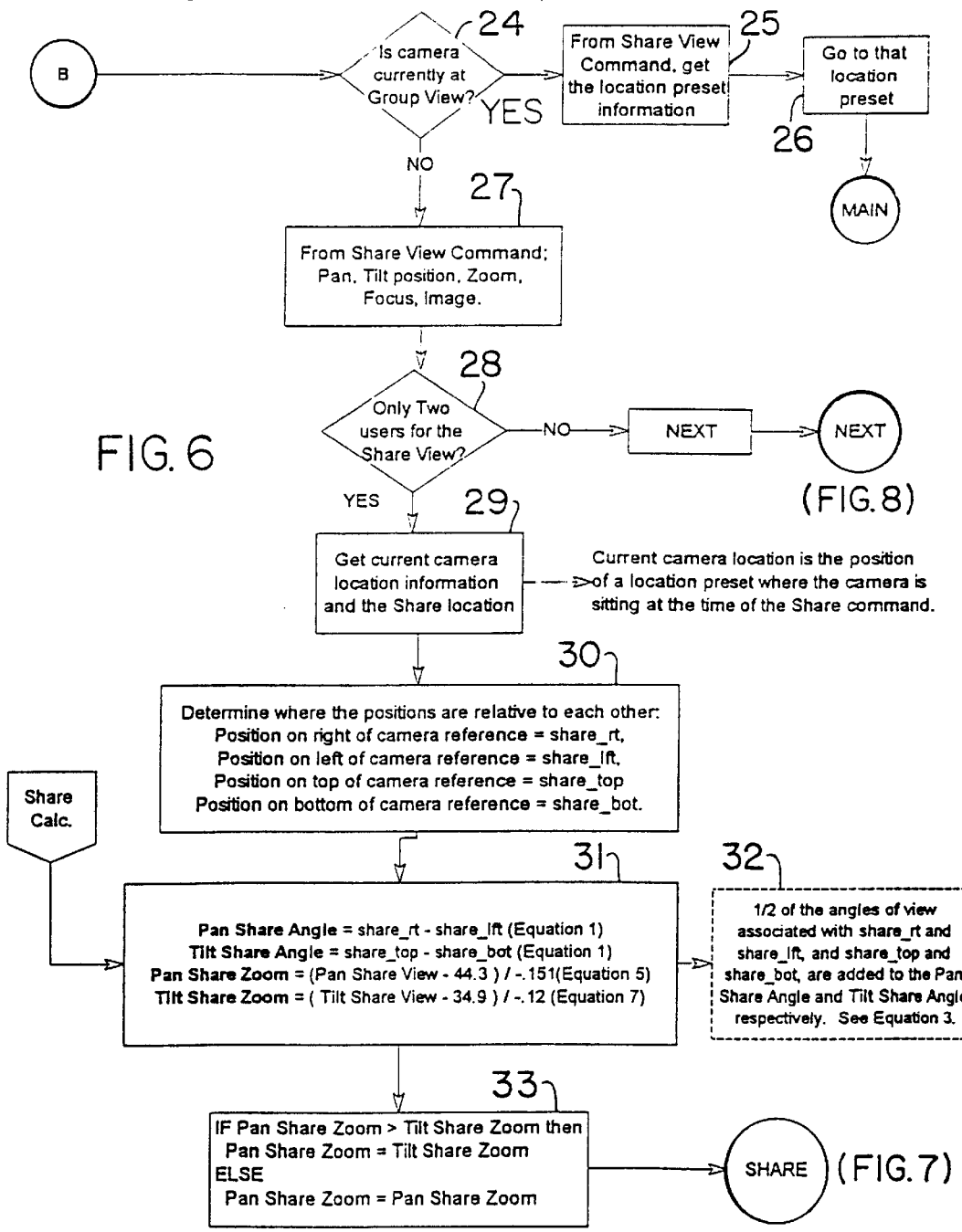
FIGS. 6–12 are flow charts of the programs used in the present invention.
Figure 7:
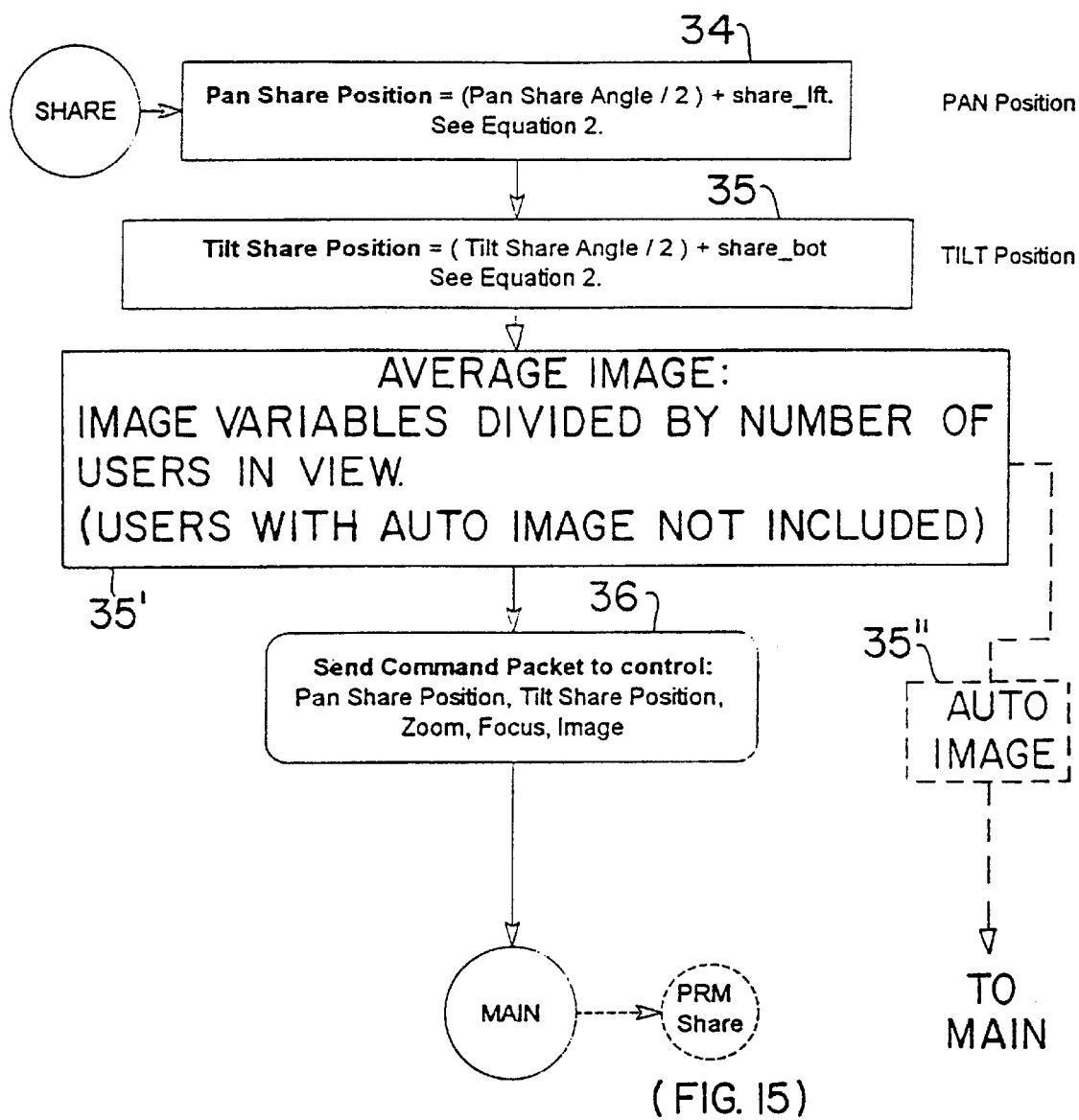
Figure 8:
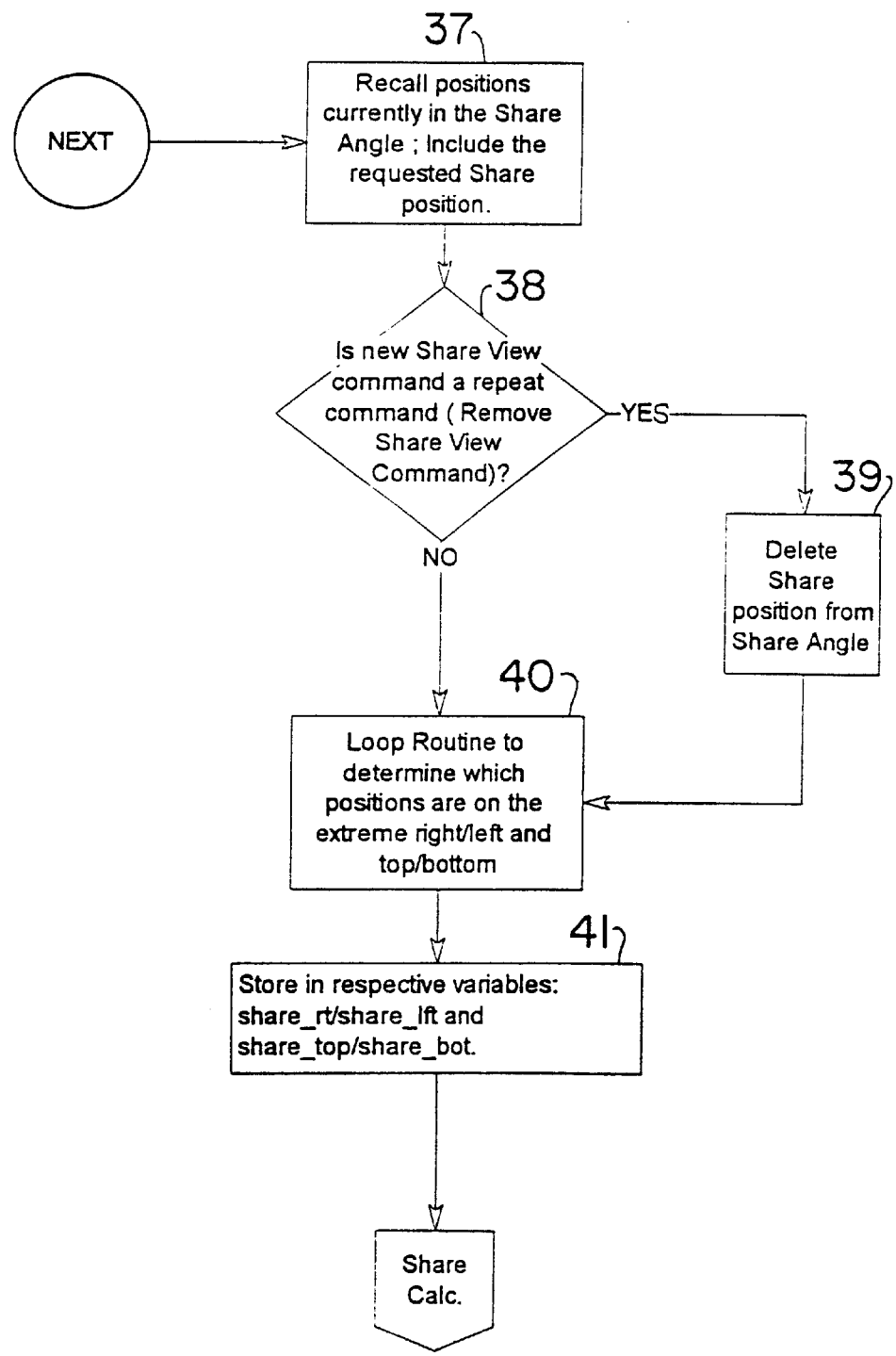
Figure 9:
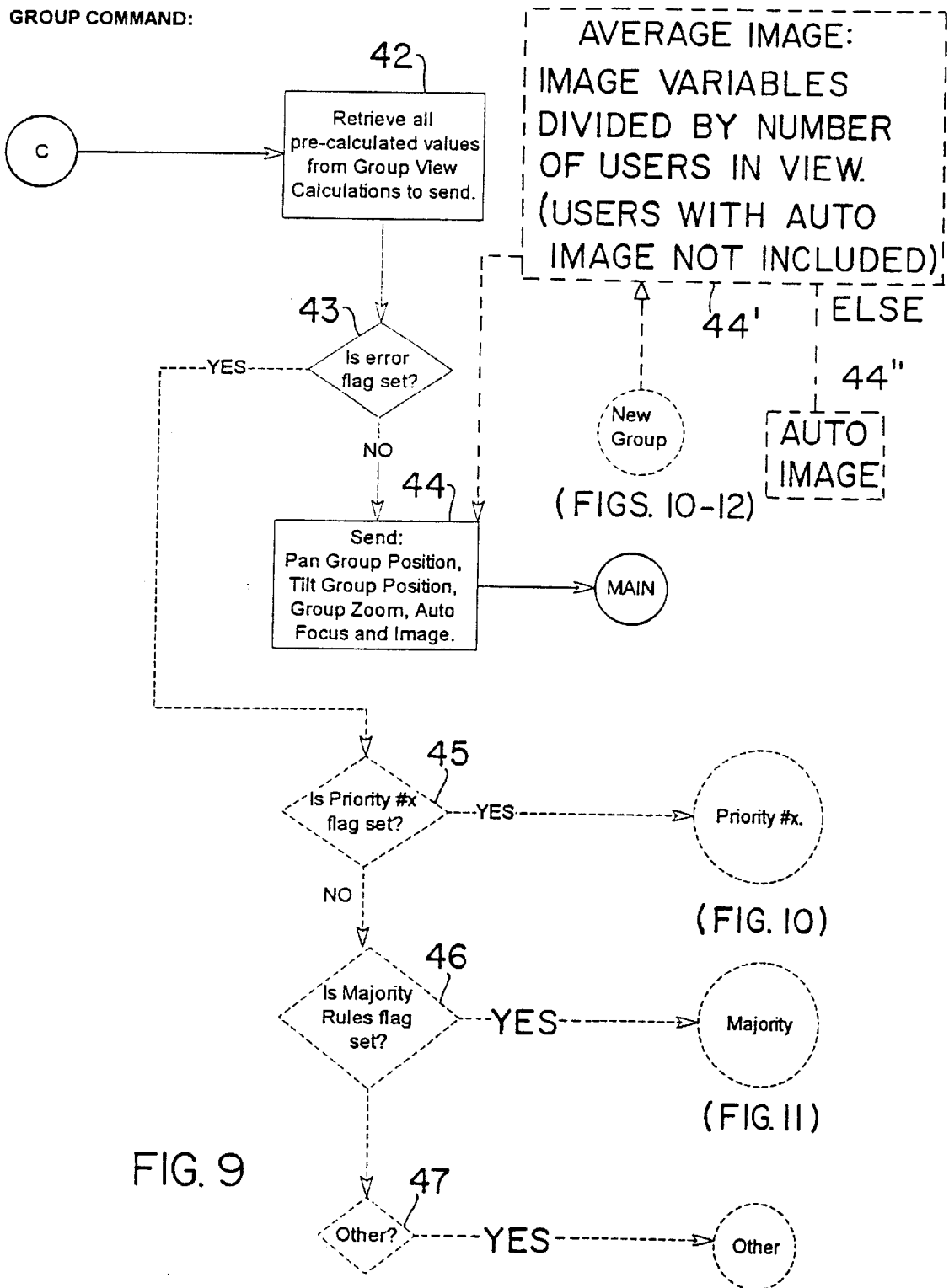

Share view is illustrated in FIGS. 6–8. As indicated, the first decision involves whether to move to a location preset from a group view (Blocks 24, 25, 26) or to operate share view. If the existing situation is already a two-user share view (Block 28) the routine of FIG. 8 is executed. If a user that has previously requested share view provides a remove share view command, the effect of the command is to remove the user from the existing share view (Blocks 37–41). If the user is creating share view the program calculates the pan and tilt share angles and associated zoom and Average Image (or Auto Image) (Blocks 29–33) and sends the data to the camera controller 10 (Blocks 34–36 in FIG. 7).

The group command program is illustrated in FIGS. 9–12. The group calculations have been previously made (FIGS. 2,3) and the data is retrieved (Block 42, FIG. 9). There are at least two optional methods of group view control if the maximum field of view of the camera is exceeded: (1) priority and (2) majority rules which are set with a flag (Blocks 43, 45, 46). Additional program options include (3) return to main program and (4) other priority options (Blocks 44, 47).

Figure 10:
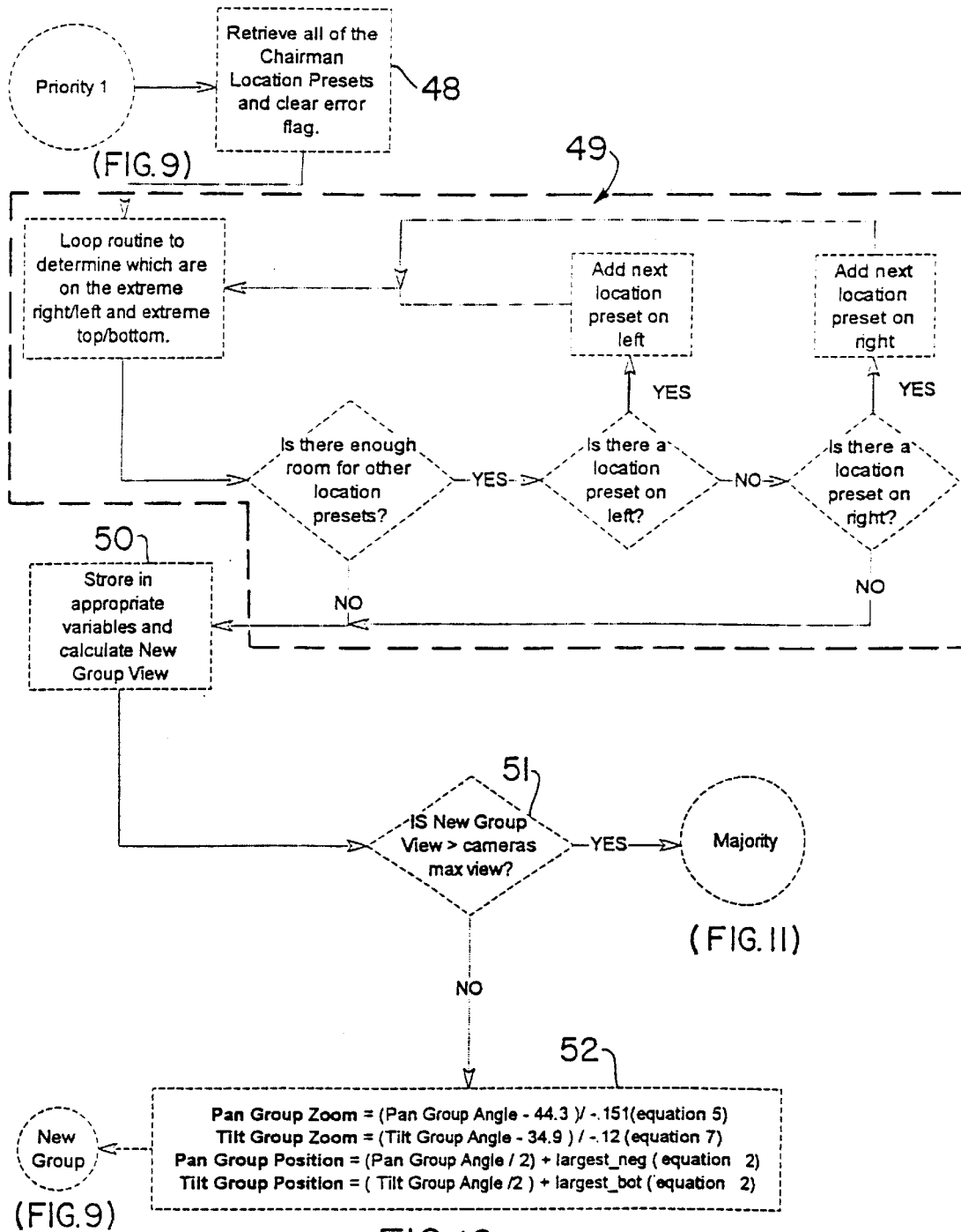
Figure 11:
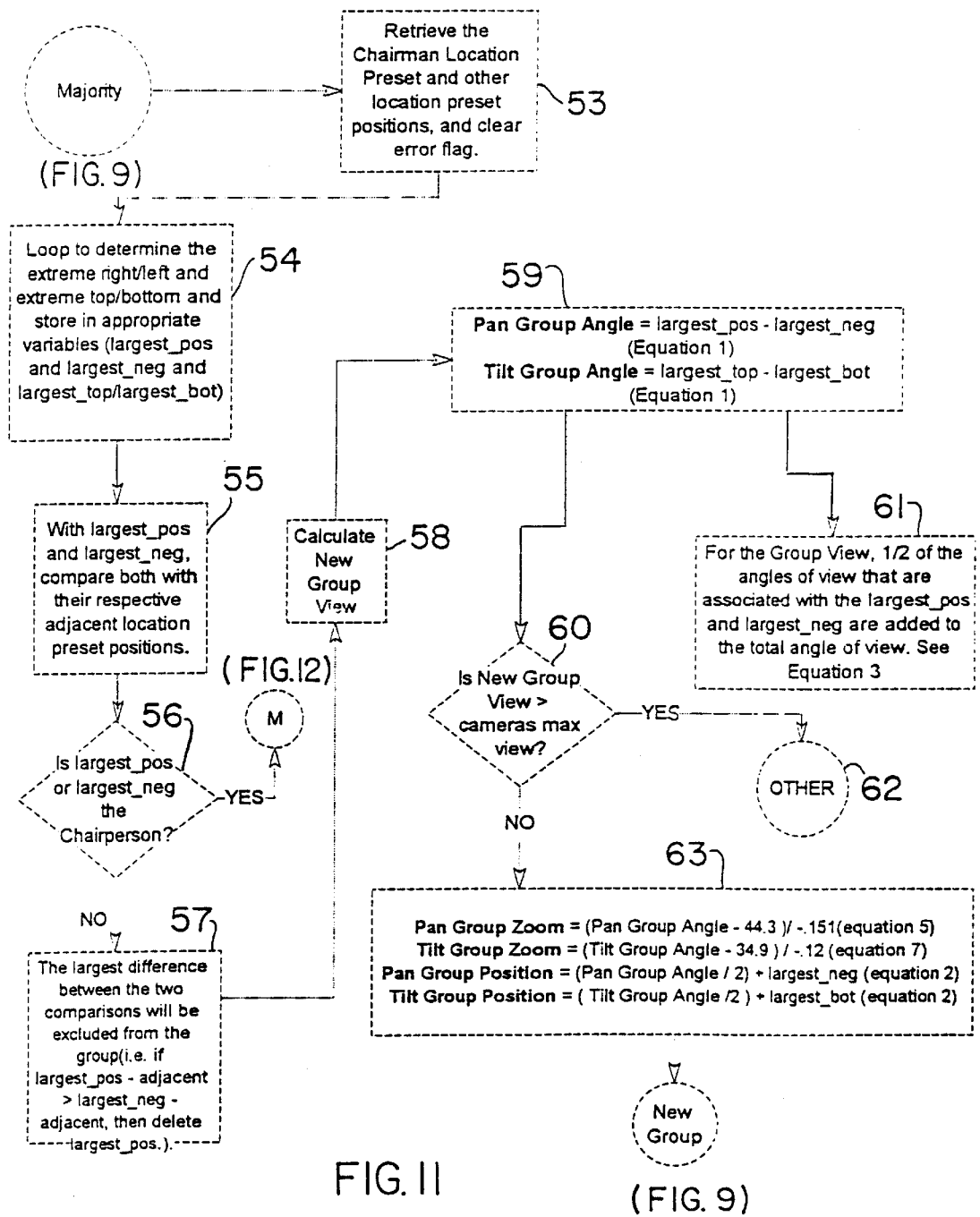
Figure 12:
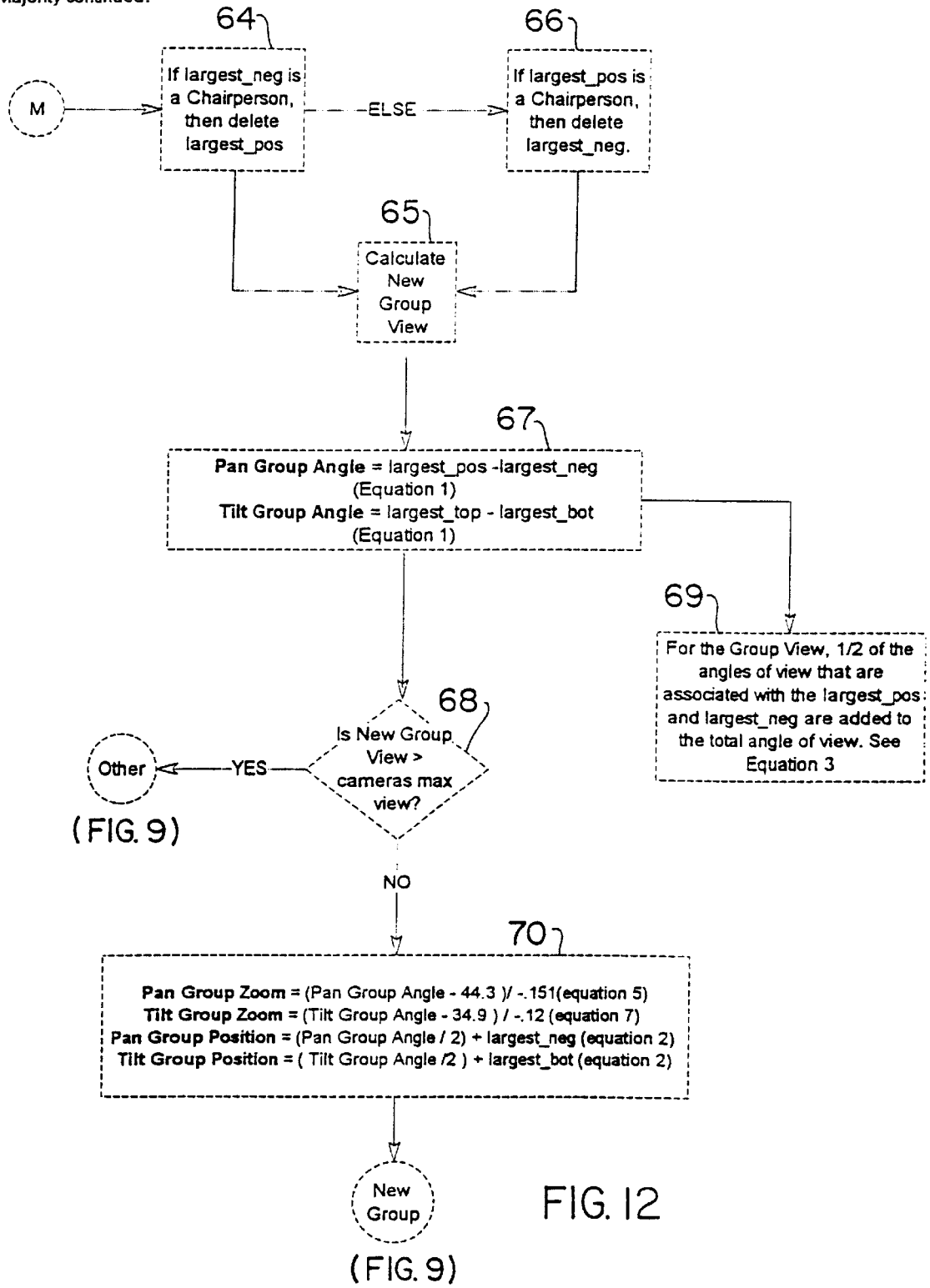

The priority scheme is illustrated in FIG. 10. As indicated, one user ("Chairperson Locator") will always be included in a group view. Data is retrieved (Block 48) and the loop routine (Blocks 49) sets up the new group view (Block 50, 52) if the desired angle of view to achieve group view is still larger than the camera's maximum field of view the "majority rules" scheme of FIGS. 11 and 12 is called for.

The majority scheme also provides for one user ("Chairperson Locator") to always be in the group view. Data is retrieved (Block 53) and a new loop routine is used to establish the size of the group view (Blocks 54, 55, 56, 57). By eliminating the user(s) at the extreme left or right (but keeping the "Chairperson Locator" in the group shot) the new view is created (Blocks 58, 59, 61, 63) unless this view is also too wide for the camera (Block 60–62). FIG. 12 illustrates the branch used if the "Chairperson" is located at the extreme left or right (Blocks 64, 66) and a new group view calculated (Blocks 65, 67, 68, 69, 70). Again, this view may also be too wide for the camera. The "other" programs are used if this is the case.

Figure 13:
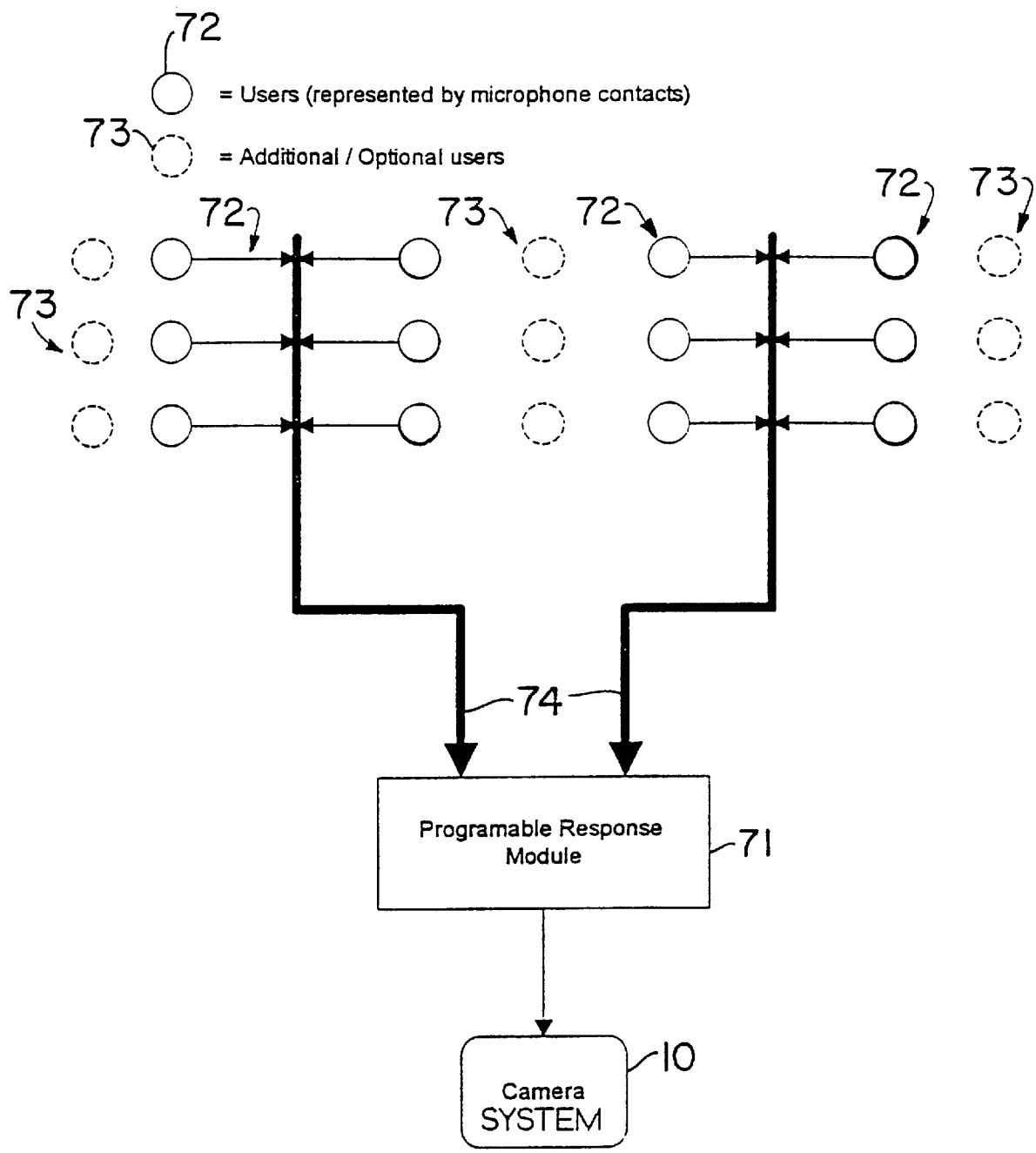
FIG. 13 is a simplified block diagram of a microphone interface used in the present invention.
Figure 14:
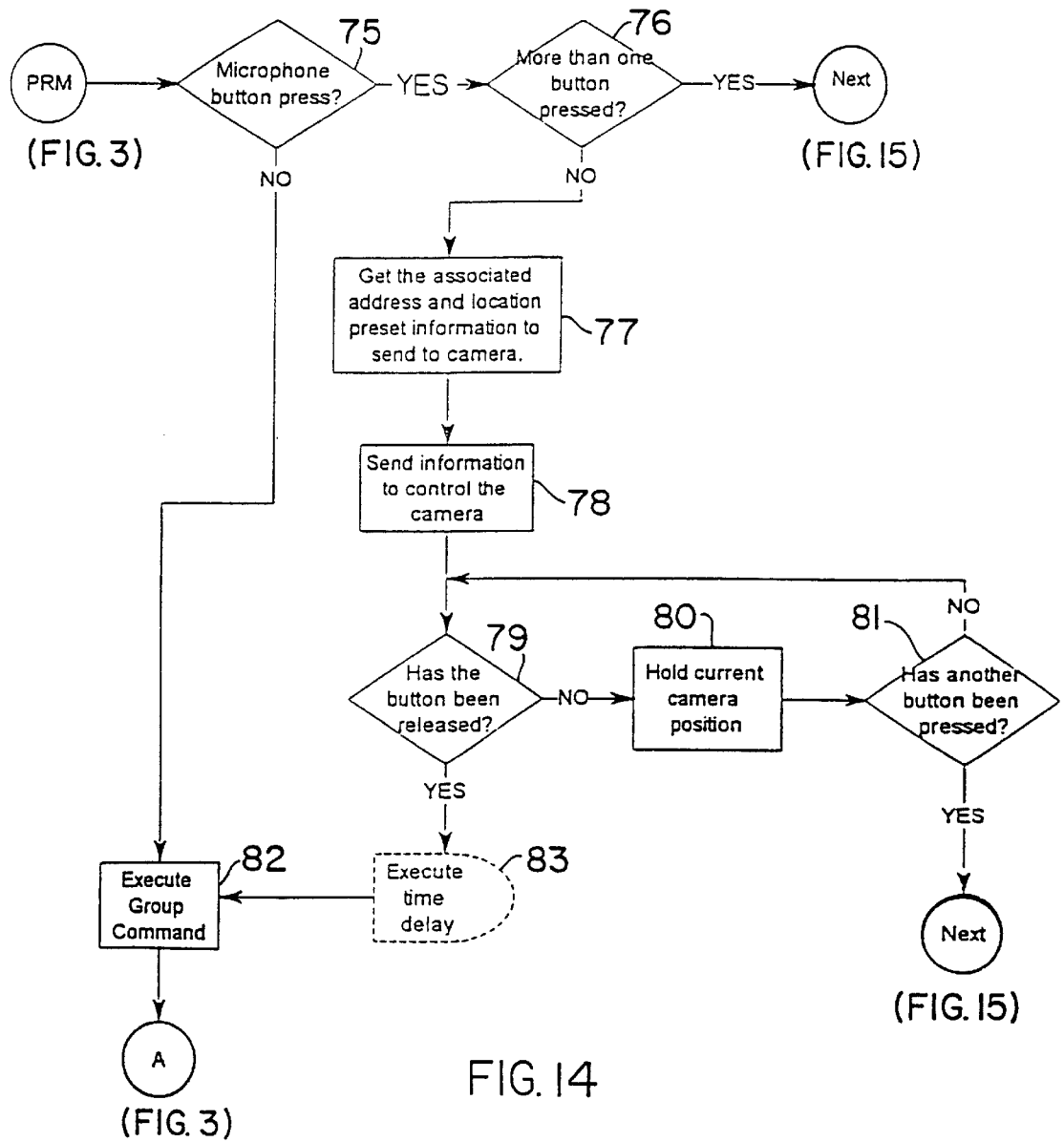
FIGS. 14–15 are flow charts that illustrate the apparatus of FIG. 13.
Figure 15:
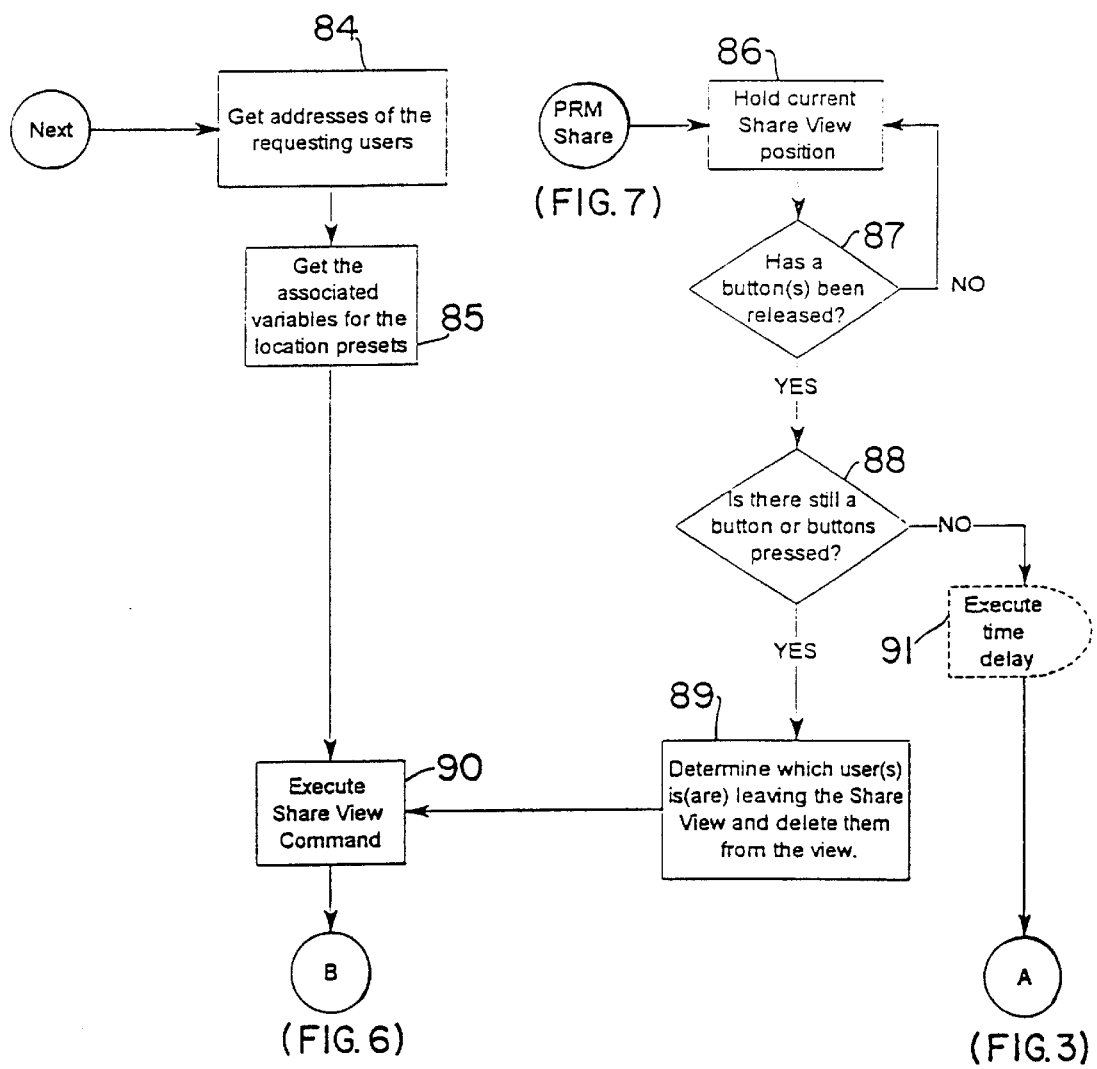

FIGS. 13–15 illustrate in detail the use of the PRM as a device that functions as the identifier of the requester. The PRM 71 receives inputs from microphones 72, 73 over buses 74 and provides control signals to base unit 10 or whatever camera control system is employed in the circumstances.

The group view calculation from FIG. 3 is the initial position of the system in FIG. 14. With only one microphone button pressed (Blocks 75, 76) the location preset and associated field of view variables of the microphone 72 requestor is used to control the camera (Blocks 77, 78, 79, 80, 81). After the mic button has been released for a predetermined time period (Block 83) the system will go to group view (Block 82).

If more than one mic button is depressed share view is initiated to include all mics represented by depressed buttons (FIG. 15, Blocks 84, 85, 90) or initiated from PRM share (FIG. 7). As buttons are released, remove share view commands are executed (Blocks 86, 87, 88, 89) until no mic buttons are depressed and then the group view is recalled after a predetermined time period (Blocks 86–91).

Figure 16:
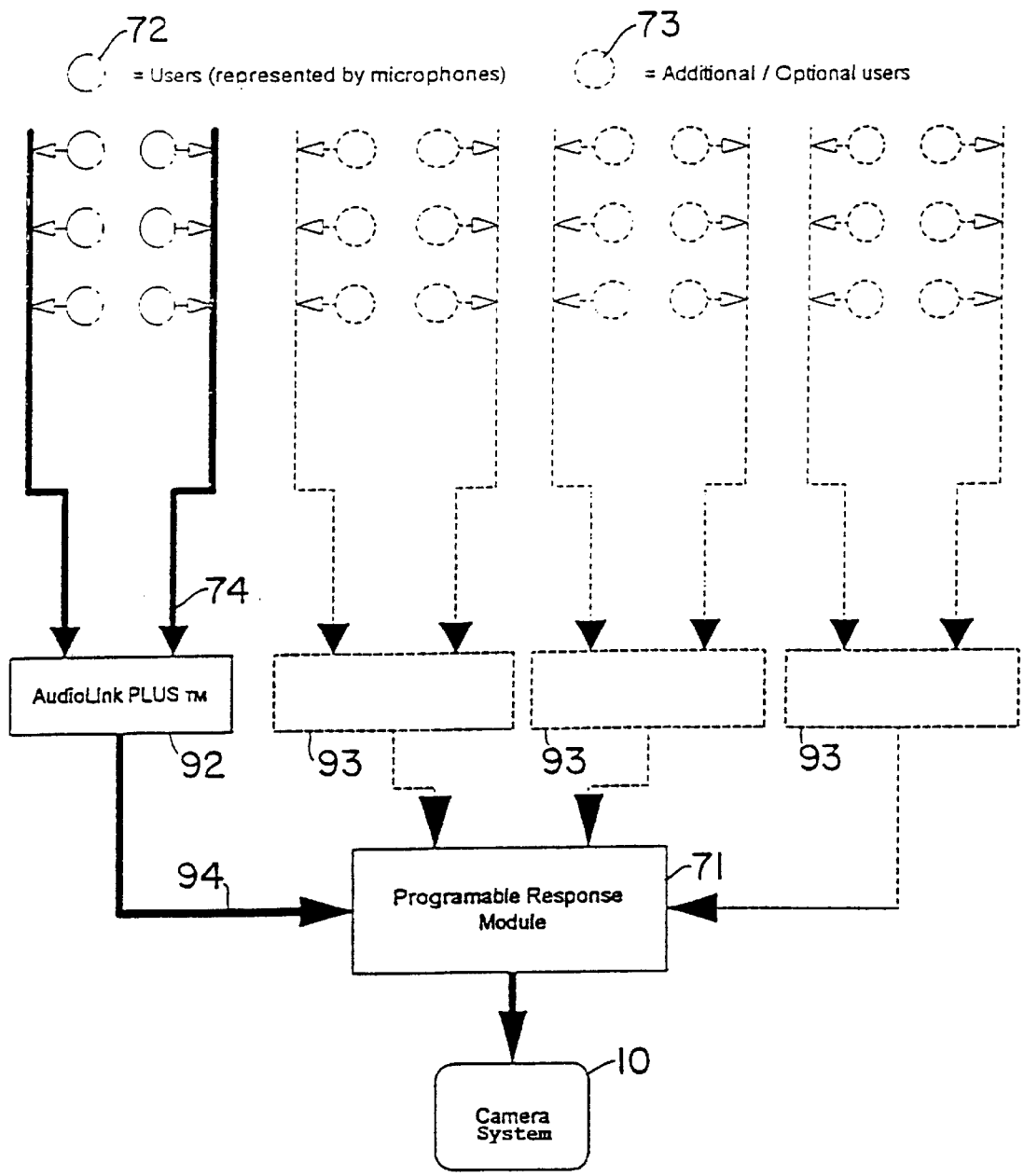
FIG. 16 is a simplified block diagram of another microphone interface used in the present invention.

FIGS. 16–19 illustrate the use of the PRM 71 with the audiolink system. FIG. 16 shows the basic setup employing audiolink plus modules 92, 93 and bus 94. FIG. 17 illustrates that with no person talking, group view is maintained and is thus the initial condition for the system. If a user begins talking into a mic 72 the system will go to the location preset data for that subject when the user has been talking long enough to time out timer 1 (Block 95). With this situation in place, an additional user speaking into a mic 72 will direct the program to the share view program of FIG. 18 (Blocks 98) to accommodate any subjects that request share view.

Timer 2 is used to timeout a user that is included in share view but has not used a mic 72 within an allotted time. When timer 2 has timed out the address for that associated user will be removed from the memory that supports share view for that view (Blocks 97) and, if only one user remains, a return to the existing location preset will follow. Additional users can be added as the audio is detected or removed if audio is not detected. Timer 3 is used to timeout to initiate the group view command (Blocks 96).

Figure 18:
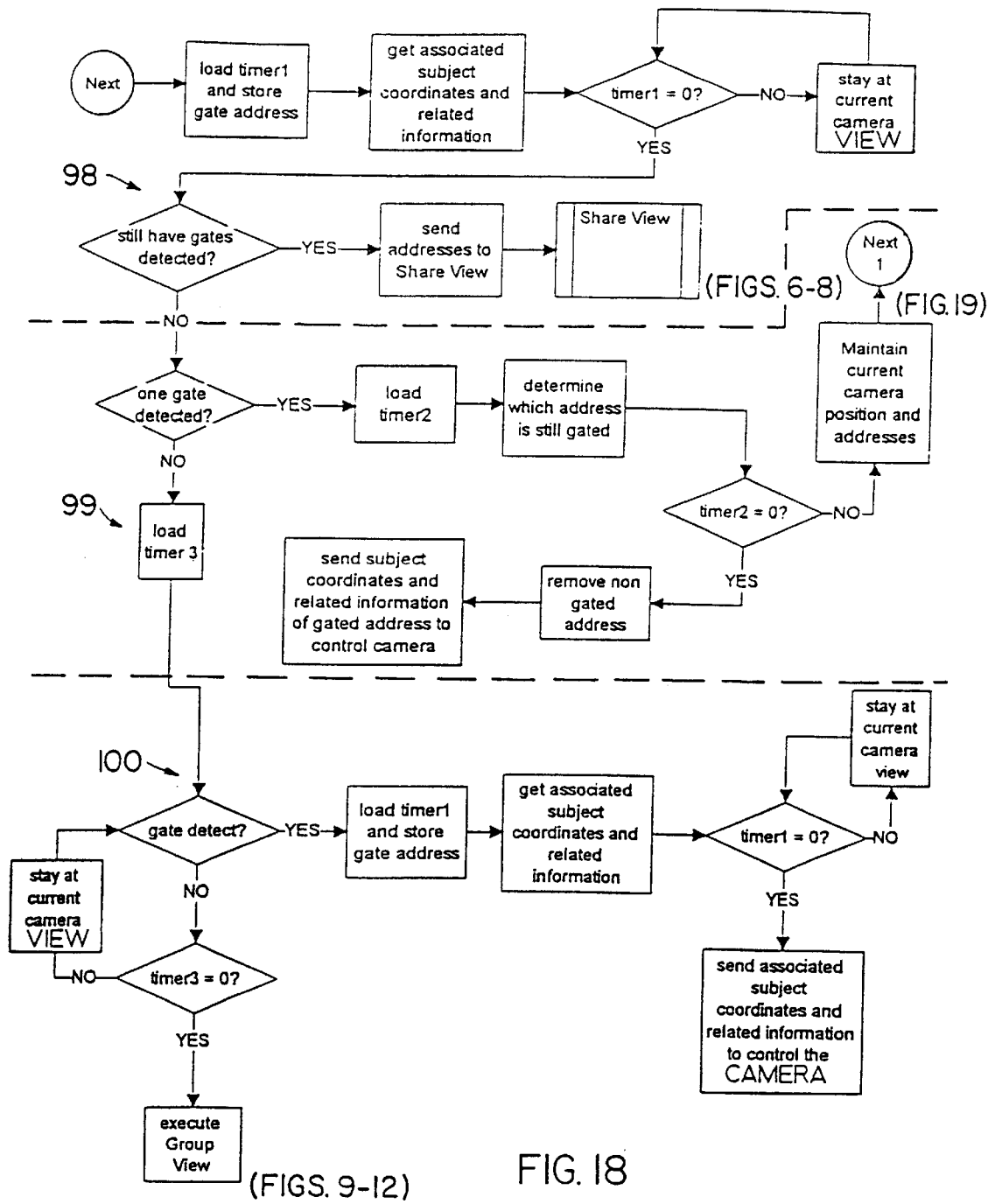
Figure 19:
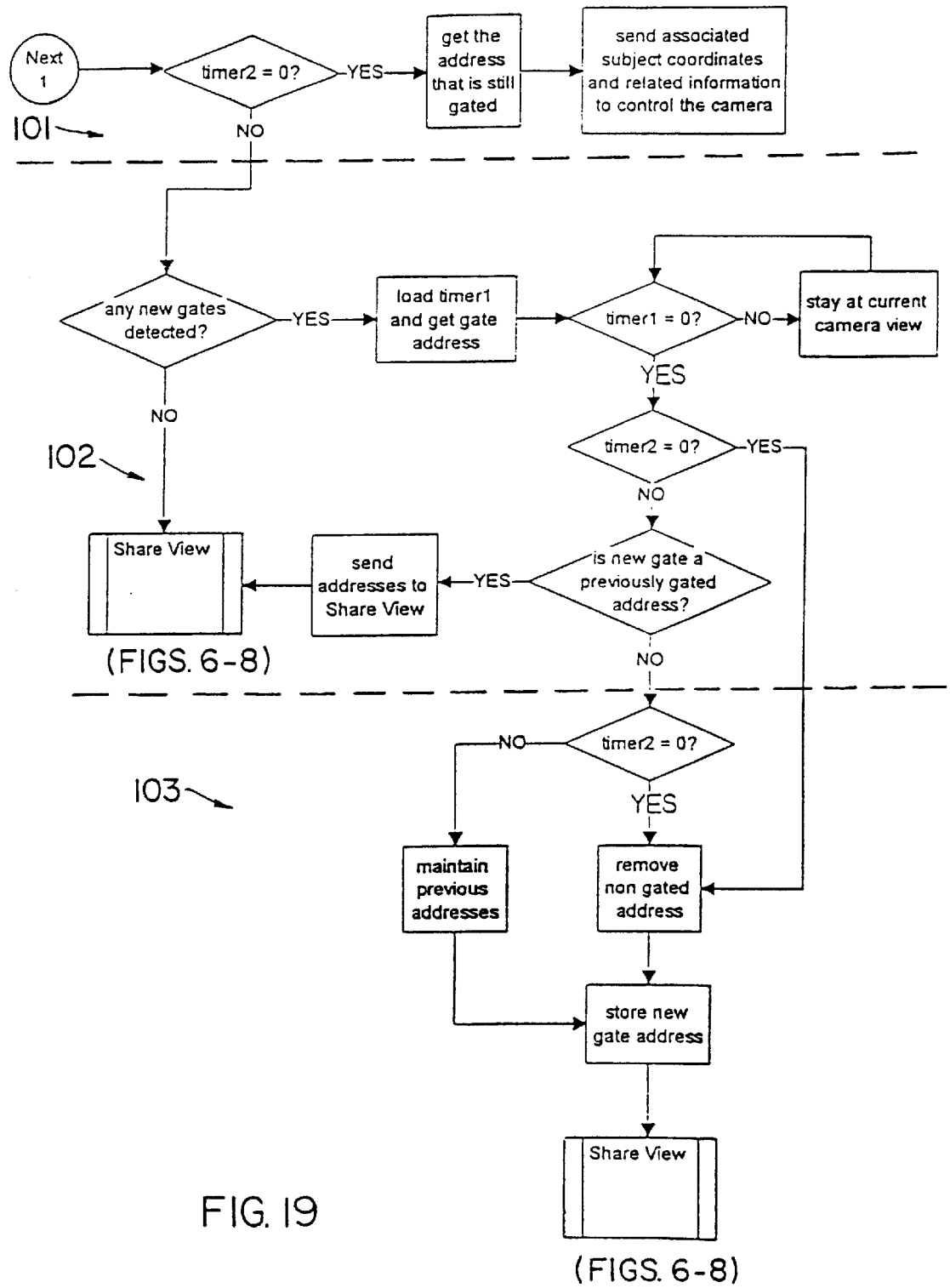

FIGS. 18, 19 illustrate the situation where if the users drop out of share view by not using a mic 72, the system will eliminate them from share view (Blocks 98, 99). The last user will be represented by a share view that is defined by location preset and associated field of view variables (Blocks 99, 101). A timer 3 timeout of the last user returns the system to group view (Blocks 100). Users may join share view up until the elimination of the last user (Blocks 102, 103).

Figure 20:
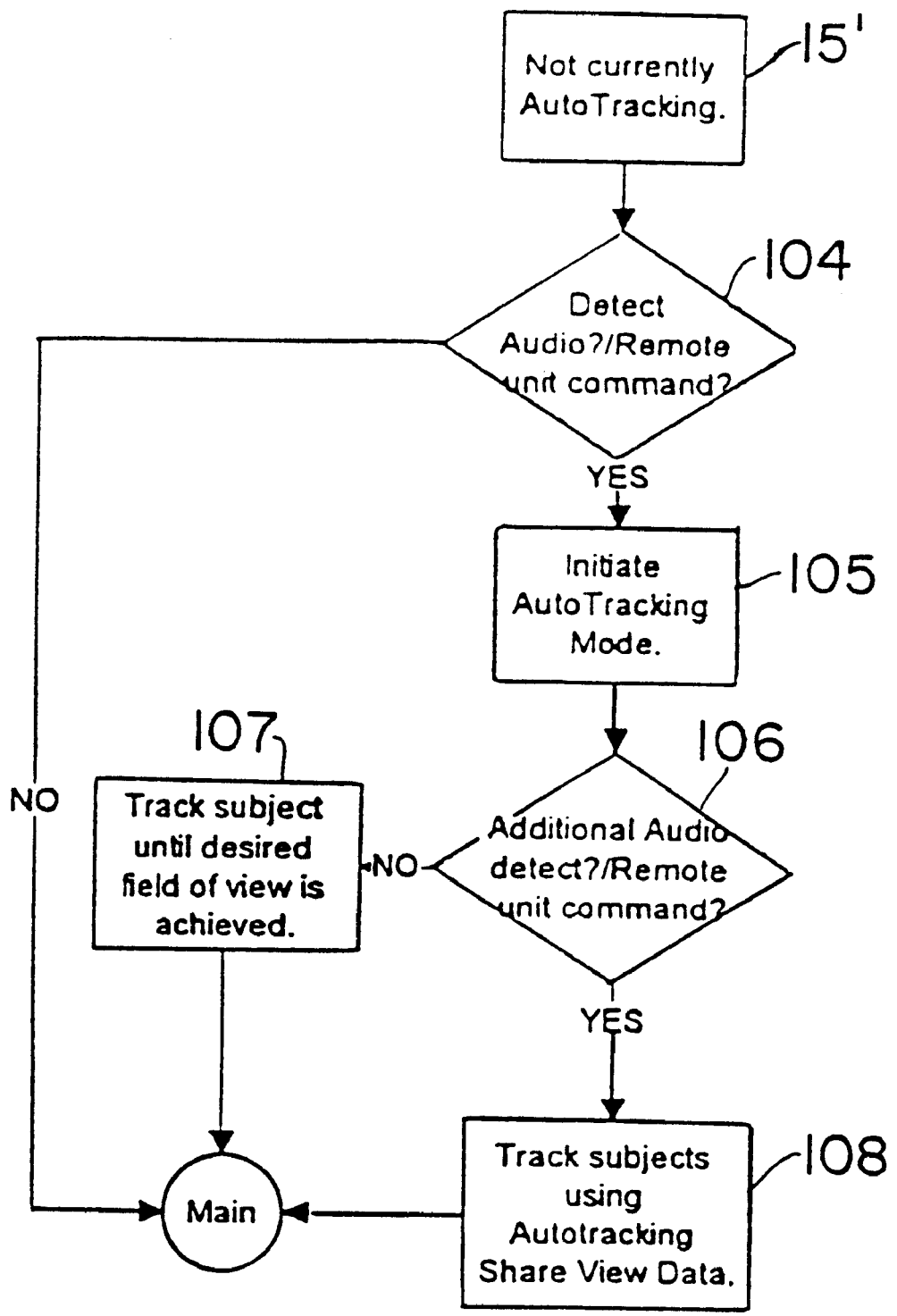

FIG. 20 illustrates the use of the autotracking capability of the system in combination with share view programming. Initially, the system is not autotracking (Block 15'). If a remote unit issues a command or audio activity is detected on the microphone (Block 104), the system will initiate autotracking (Block 105). The system can continuously track the subject and will employ the auto image option during tracking (Block 107). Alternately, if the system detects more than one remote unit, or more than one audio detection occurs, then the system will track the subjects using the Autotracking Share View data until the desired field of view is achieved (Block 108). In either autotracking scene, the subject coordinates and related information is derived from automatic tracking system data to create Autotracking Share View.

Appendix "A" is the firmware for the personal locator. Appendix "B" is the share view firmware for the base unit. Appendix "C" is the firmware for the PRM.

Definitions of Equations

The desired angle between location presets:

$$\beta = \theta_2 - \theta_1 \quad \text{(equation 1)}$$

The camera position between the selected location presets:

$$\phi = \beta/2$$

therefore, making the position of the camera relative to the position located furthest on the left:

$$\Phi = \theta_1 + \phi \quad \text{(equation 2)}$$

The desired angle of view between the two selected location presets with the associated fields of view of the location presets included:

$$fov = \beta + \alpha_1/2 + \alpha_2/2 \quad \text{(equation 3)}$$

A linear function was used to relate the zoom position of the camera to the field of view: For the pan field of view:

$$p\_fov = -0.151*z + 44.3 \text{ (degrees)} \quad \text{(equation 4)}$$

and solving for zoom:

$$z = (p\_fov - 44.3)/-0.151 \quad \text{(equation 5)}$$

For the tilt field of view:

$$t\_fov = -0.12*z + 34.9 \text{ (degrees)} \quad \text{(equation 6)}$$

and solving for zoom:

$$z = (t\_fov - 34.9)/-0.12 \quad \text{(equation 7)}$$

TABLE 1

For the camera used, a linear function was used to relate the Zoom of the camera to the angle of view.

aov=f(z)

Conditions:

Pan Angle of View (p_aov)=44.3 degrees @ Zoom (z)=0.
  Pan Angle of View (p_aov)=5.8 degrees @ Zoom (z)=255.

$p\_aov = 44.3$ at $z = 0$
$p\_aov = 5.8$ at $z = 255$
$\frac{44.3 - 5.8}{.0 - 255} = -0.151$ Pan slope $p\_aov = -.151 \cdot z + 44.3$ This is the Pan equation used for the Sony 310. For a given Zoom, there is an associated angle of view. (equation 4)

$z = \frac{p\_aov - 44.3}{-.151}$ Solve for Zoom(z) from equation 4 (equation 5)

Condition:
Tilt Angle of View (t_aov)=34.9 degrees @ Zoom (z)=0
Tilt Angle of View (t_aov)=4.4 degrees @ Zoom (z)=255

$t\_aov = 34.9$ at $z = 0$
$t\_aov = 4.4$ at $z = 255$
$\frac{34.9 - 4.4}{0 - 255} = -0.12$ Tilt slope.

$t\_aov = -.12 \cdot z + 34.9$ This is the Tilt angle equation used for the Sony 310 For a given Zoom, there is an associated angle of view. (equation 6)

$z = \frac{t\_aov - 34.9}{-.12}$ Solve for Zoom(z) from equation 6. (equation 7)

TABLE 2

What is claimed is:

1. An automatic control system for controlling the creation of a field of view of one camera being controlled by an automatic control system comprising means for selecting values for one or more field of view variables from the following list of variables that define the field of view of the one camera to create a field of view unique to each subject, field of view position variables, field of view perspective variables, camera imaging variables, and automatic control system variables; means for defining a share view as the field of view created by the one camera other than the field of view unique to each subject created by combining respective position coordinates of each of at least two subjects and field of view variables associated with each of the at least two subjects; means for issuing a command to said automatic control system requesting a first share view for the at least two subjects identifiable as such by said automatic control system; and means for controlling the at least one camera by said automatic control system to provide for the field of view requested in accordance with the values selected.

2. The system as defined in claim 1 further including means for establishing a location preset for each subject in terms of the position coordinates of each of at least two subjects.

3. The system as defined in claim 2 further including means for issuing a command by either of the at least two subjects for controlling the camera by said automatic control system to provide the field of view of the camera to be the established location preset of the subject that issued such command.

4. The system as defined in claim 3 further including means for issuing a command from either of the at least two subjects requesting a second share view for the at least two subjects, means for recalling the location preset for the subject that did not issue such command, means for determining relative positions of the location presets for the at least two subjects, means for calculating the values of the field of view variables of the camera necessary to create the second share view, and means for controlling the field of view of the camera to provide for the second share view.

5. The system as defined in claim 3 further including means for calculating a respective angle of view of the camera for each of the location presets.

6. The system as defined in claim 4 further including means for issuing a command from a third subject requesting a third share view for the at least two and the third subjects, means for recalling the location presets for each of the subjects to be in the third share view, means for determining the relative positions of the location presets for each of the subjects, means for calculating the values of the field of view variables of the camera necessary to create the requested third share view, and means for controlling the field of view of the camera to provide the requested third share view.

7. The system as defined in claim 6 further including means for issuing a command by one of the subjects requesting to be removed from the third share view, means for creating a fourth share view for the two subjects that did not request removal from the third share view, and means for controlling the field of view of the camera to provide for a fourth share view for the two subjects.

8. The system as defined in claim 1 further including means for issuing a command from one of at least two subjects that is identifiable by said automatic control system as requesting a second share view for the at least two subjects, means for creating the second share view, and means for controlling the field of view of the camera by said automatic control system to provide the second share view.

9. The system as defined in claim 8 further including means for determining the respective position coordinates of each of the at least two subjects, means for providing values for the variables to create another field of view of the camera that includes the at least two subjects, and means for combining the position coordinates and the values to provide that the at least two subjects are in the another field of view of the camera.

10. The system as defined in claim 9 further including means for issuing another command from a third subject requesting a share view for the at least two and the third subjects, means for creating a third share view, and means for controlling the field of view of the camera by said automatic control system to provide the third share view.

11. The system as defined in claim 9 further including means for establishing a location preset for each subject in terms of the position coordinates of each of at least two subjects, and means for recalling the location presets for each subject.

12. The system as defined in claim 9 further including means for recalling the location presets for each of the at least two subjects, means for determining relative positions of the location presets for each of the at least two subjects, means for calculating values of the field of view variables necessary to create a second field of view that includes all subjects, means for combining the positions determined and the values calculated to define a group view of all the subjects, and controlling the field of view of the camera by said automatic control system to provide the group view.

13. The system as defined by claim 12 further including means for determining whether the field of view of the camera required for group view exceeds the field of view attainable for the camera.

14. The system as defined in claim 12 further including means for defining group angle as representing from the position of the camera the angle of view of the camera in at least one plane required to include all subjects in the field of view, means for determining from the relative position of each subject an angle in a horizontal plane from the position of the camera between the location presets of the subjects furthest to the right and left of a reference established by said automatic control system, means for determining from the relative position of the camera between the location presets of the subjects uppermost and bottommost of a reference established by said automatic control system, means for determining a horizontal group angle from the angle determined, and means for determining a vertical group angle from the angle determined.

15. The system as defined in claim 14 further including means for determining whether the horizontal group angle is greater than a maximum angle of view of the camera, and means for determining whether the vertical group angle is greater than a maximum angle of view of the camera.

16. The system as defined in claim 12 further including means for issuing by a subject that is in the group view a command identifiable by said automatic control system as requesting a second share view for the respective subject, and means for operating the camera by said automatic control system to provide that the field of view of the camera is the location preset of the respective subject.

17. The system as defined in claim 16 further including means for issuing by another subject that is in the group view a command identifiable by the automatic control system as requesting a third share view for the another subject control system the third share view for the two subjects, and means for controlling the camera by the automatic control system to provide for the third share view.

18. The system as defined in claim 17 further including means for issuing by one of the subjects a command identifiable by said automatic control system as requesting that the respective subject be removed from the third share view, means for creating by the automatic control system a fourth share view without the one subject remaining in the field of view of the camera, and means for controlling the camera field of view by said automatic control system to provide for the fourth share view.

19. The system as defined in claim 18 further including means for determining the time that the camera is controlled to provide the fourth share view, and means for controlling the camera field of view by the automatic control system to provide group view if the time determined is greater than a predetermined time as established by said automatic control system.

20. The system as defined in claim 19 further including means for maintaining the camera field of view at the position of the fourth shareview if the time determined is not greater than said predetermined time.

21. An automatic control system for controlling the creation of a field of view of one camera being controlled by an automatic control system comprising means for selecting values for one or more field of view variables from the following list of variables that defined the field of view of a camera to create at least two unique field of views, field of view position variables, field of view perspective variables, camera imaging variables, and automatic control system variables; means for defining a share view as created by combining at least two unique field of views of a camera, each being other than the fields of view unique to each subject, each having at least one unique position coordinate and both coordinates being in a single plane, means for requesting a share view identifiable as such by said automatic control system, and means for controlling the field of view of the camera by said automatic control system to provide for the share view requested in accordance with the values selected.

22. The system as defined in claim 21 wherein said means for selecting values for at least two unique field of views includes means for selecting values for respective subjects at different coordinates.

23. The system as defined in claim 21 further including means for issuing a command by either of the subjects.

24. The system as defined in claim 23 wherein said means for selecting values for at least two unique field of views includes means for selecting values for respective subjects at different coordinates.

25. The system as defined in claim 21 further including means for establishing a location preset for each of the at least two field of views of the camera.

26. The system as defined in claim 25 further including means for issuing a command to said automatic control system to provide the field of view of the camera to be the location preset of either the at least two field of views of the camera.

* * * * *